United States Patent
Seo et al.

(10) Patent No.: US 10,989,942 B2
(45) Date of Patent: Apr. 27, 2021

(54) MOLD FRAME AND DISPLAY DEVICE HAVING A POLARIZATION MEMBER WITH PROTECTION FILM AND MOLD FRAME

(71) Applicant: Samsung Display Co., Ltd., Yongin-si (KR)

(72) Inventors: You Jin Seo, Hwaseong-si (KR); Kyu Hun Shim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/840,055

(22) Filed: Apr. 3, 2020

(65) Prior Publication Data
US 2021/0033914 A1 Feb. 4, 2021

(30) Foreign Application Priority Data
Jul. 30, 2019 (KR) .................. 10-2019-0092554

(51) Int. Cl.
*G02F 1/1333* (2006.01)
*G02F 1/1335* (2006.01)
*G02F 1/13357* (2006.01)

(52) U.S. Cl.
CPC .. *G02F 1/133308* (2013.01); *G02F 1/133528* (2013.01); *G02F 1/133603* (2013.01); *G02F 1/133606* (2013.01); *G02F 2001/133314* (2013.01); *G02F 2001/133317* (2013.01); *G02F 2201/50* (2013.01)

(58) Field of Classification Search
CPC ............ G02F 1/133308; G02F 1/0311; G02F 2203/16
See application file for complete search history.

(56) References Cited

U.S. PATENT DOCUMENTS

| 10,070,538 B2 * | 9/2018 | Park .................. G02F 1/133512 |
| 2020/0264473 A1 * | 8/2020 | Aruga .................. G02B 6/0073 |

FOREIGN PATENT DOCUMENTS

| KR | 10-1710188 | 2/2017 |
| KR | 10-2018-0078929 | 7/2018 |

* cited by examiner

*Primary Examiner* — Robert J May
(74) *Attorney, Agent, or Firm* — H.C. Park & Associates, PLC

(57) ABSTRACT

A display device including: a mold frame having a rectangular shape; and a polarizing member disposed on a display panel, including: a polarizing film; and a protective film disposed on the polarizing film, including: a first protective area overlapping the polarizing film; and a second protective area protruding from respective sides of the first protective area and not overlapping the polarizing film. The mold frame includes: mold side surface portions; a panel support part extending inward from respective upper ends of the mold side surface portions; and mold ribs extending upward from the upper ends of the respective mold side surface portions, having widths smaller than the respective mold side surface portions. The second protective area of the protective film is bent to cover an outer side surface of the mold rib and an outer side surface of the mold side surface portion.

20 Claims, 23 Drawing Sheets

FIG. 4
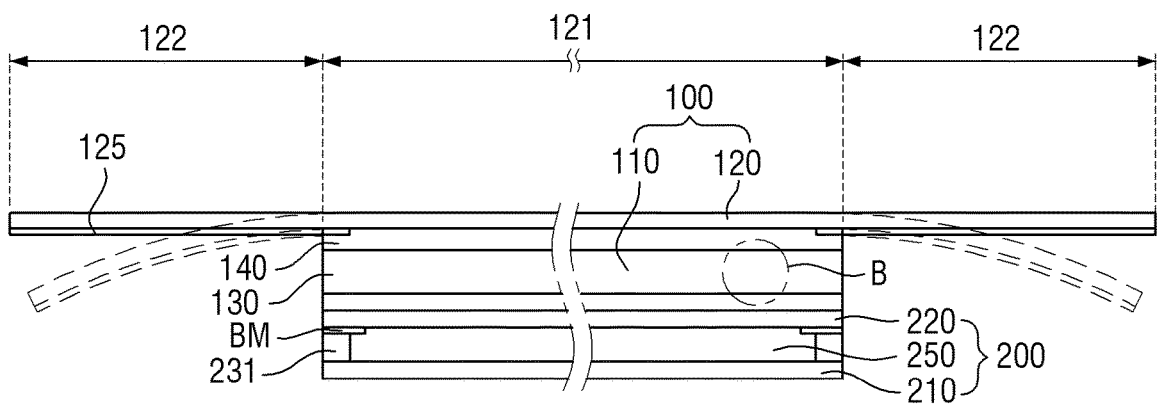
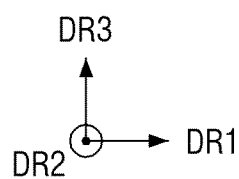

FIG. 6
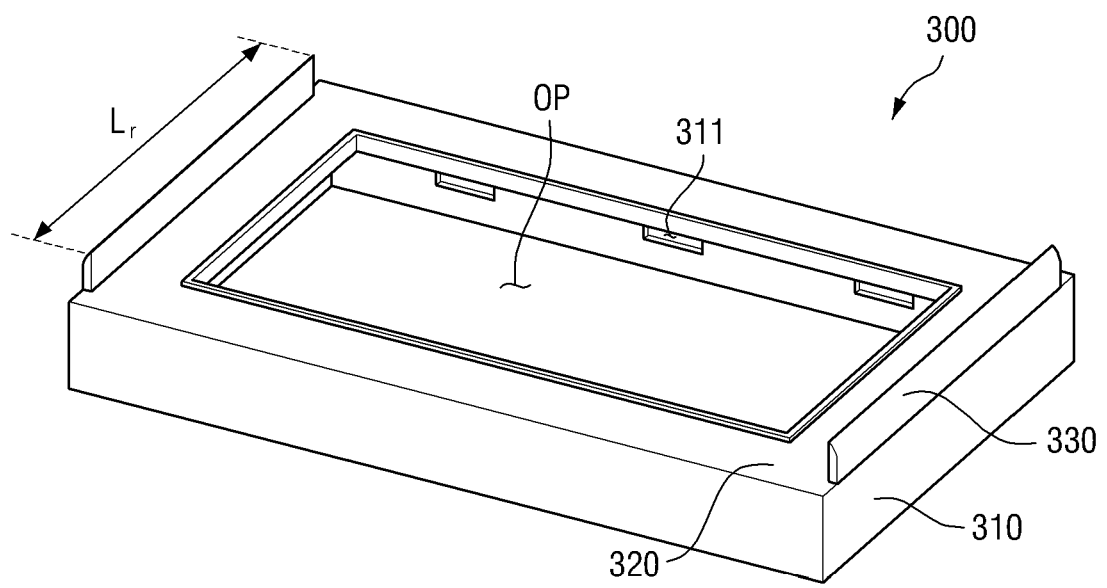
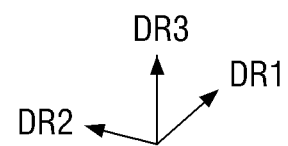

FIG. 14
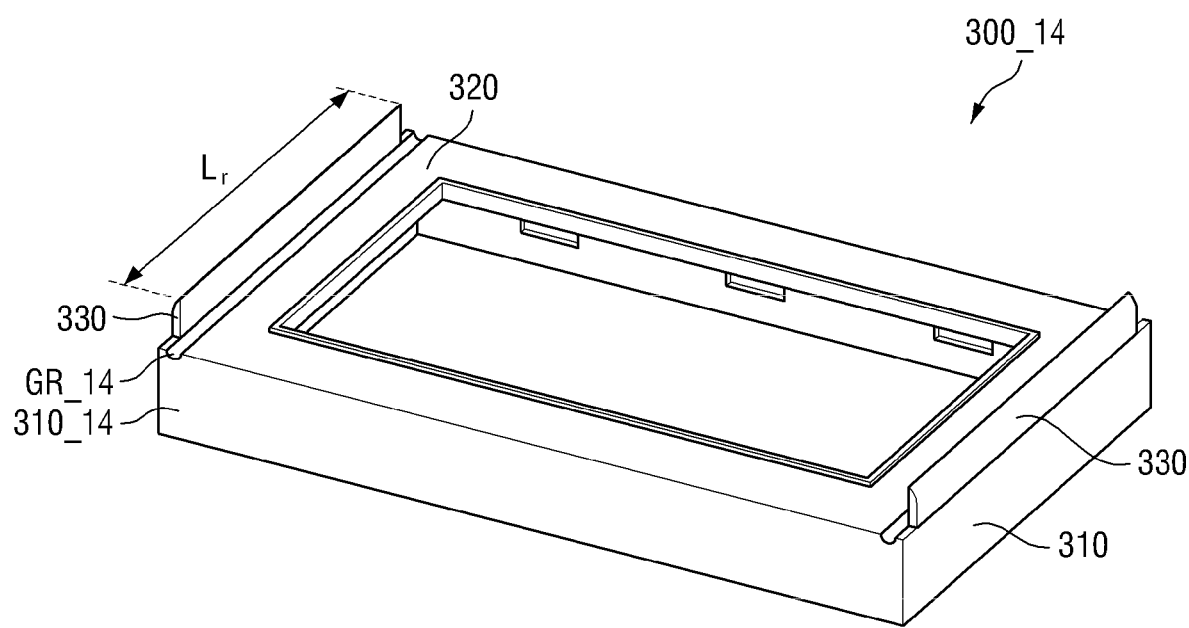
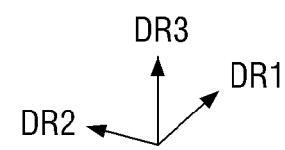

FIG. 18
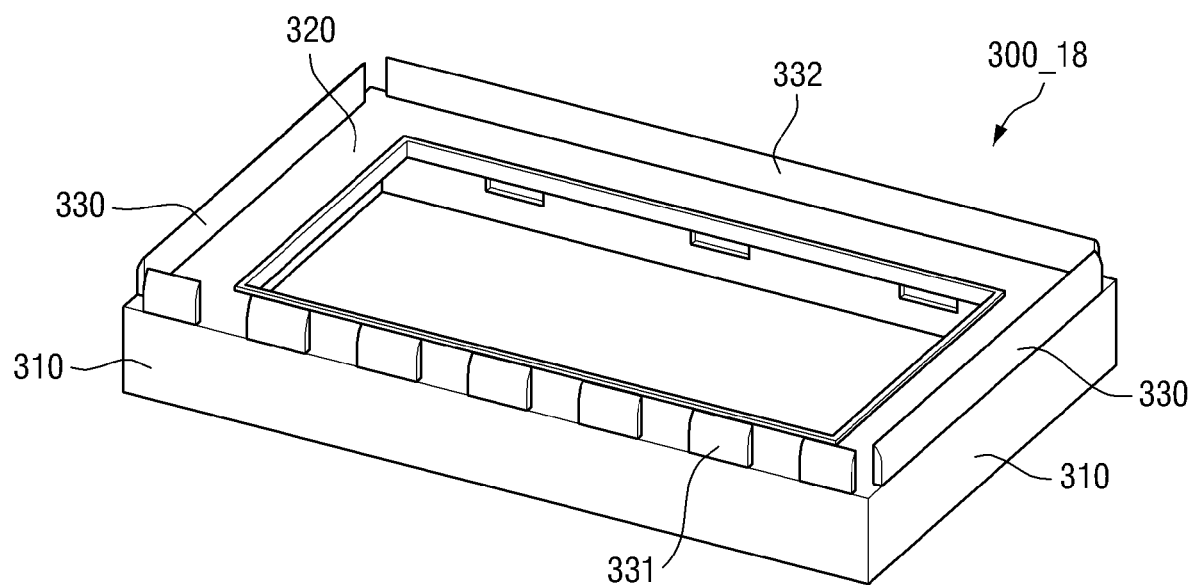
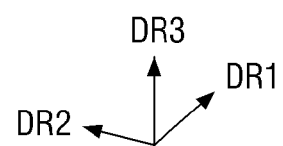

MOLD FRAME AND DISPLAY DEVICE HAVING A POLARIZATION MEMBER WITH PROTECTION FILM AND MOLD FRAME

CROSS REFERENCE TO RELATED APPLICATION

This application claims priority from and the benefit of Korean Patent Application No. 10-2019-0092554, filed on Jul. 30, 2019, which is hereby incorporated by reference for all purposes as if fully set forth herein.

BACKGROUND

Field

Exemplary embodiments/implementations of the invention relate to a display device.

Discussion of the Background

In a non-light emitting type display device such as a liquid crystal display device, a display panel that generates an image does not emit light by itself and generates an image using light provided from a backlight unit. The backlight unit includes a diffusion plate configured to diffuse light emitted from the light source.

Recently, in addition to technical research and development of a liquid crystal display device, the necessity of research and development of a design of a product to further appeal to consumers is particularly emerging. Accordingly, an effort to reduce a thickness of the liquid crystal display device and decrease a bezel width of the liquid crystal display device has proceeded.

The above information disclosed in this Background section is only for understanding of the background of the inventive concepts, and, therefore, it may contain information that does not constitute prior art.

SUMMARY

Devices constructed according to exemplary embodiments of the invention are capable of providing a display device having decreased tensile force applied to a protective film according to contraction of a polarizing film. The exemplary embodiments are directed to providing a display device having a bezel with decreased width, and further, a bezel may not seem to be substantially present.

Additional features of the inventive concepts will be set forth in the description which follows, and in part will be apparent from the description, or may be learned by practice of the inventive concepts.

According to one or more exemplary embodiments of the invention, a display device includes: a light source member; a mold frame having a rectangular shape disposed on the light source member; a display panel disposed on the mold frame; and a polarizing member disposed on the display panel, the polarizing member including: a polarizing film; and a protective film disposed on the polarizing film, the protective film including: a first protective area overlapping the polarizing film; and a second protective area protruding from respective sides of the first protective area and not overlapping the polarizing film, wherein the mold frame includes: mold side surface portions; a panel support part extending inward from respective upper ends of the mold side surface portions; and mold ribs extending upward from the upper ends of the respective mold side surface portions, the mold ribs having widths smaller than those of the respective mold side surface portions, wherein the display panel is disposed on the panel support part of the mold frame, and wherein the second protective area of the protective film is bent to cover an outer side surface of the mold rib and an outer side surface of the mold side surface portion.

The second protective area of the protective film may be attached to the outer side surface of the mold side surface portion.

The display device may further include a bottom chassis disposed under the light source member, and the light source member may be disposed in the bottom chassis.

The second protective area of the protective film may further cover a lower surface of the mold side surface portion.

The second protective area of the protective film may be attached to a lower surface of the bottom chassis.

The bottom chassis may include: sidewall portions; and sidewall protruding portions protruding outward from the sidewall portions, and the mold frame may further include side surface grooves disposed in an inner side surface of the mold side surface portion, and the sidewall protruding portions may be inserted into the side surface grooves.

A width of the mold rib may be smaller than a width perpendicular to an extending direction of the panel support part.

The mold rib may include: a base portion adjacent to the mold side surface portion, the base portion having a uniform width; and a tip portion connected to the base portion, the tip portion having a width smaller than a width of the base portion.

The width of the tip portion may decrease in an upward direction.

An outer side surface of the base portion may be aligned flush with an outer side surface of the mold side surface portion, and an inner side surface of the tip portion may be aligned flush with an inner side surface of the base portion.

According to one or more exemplary embodiments of the invention, a display device includes a first side, a second side, a third side, and a fourth side forming a quadrilateral shape, the display device including: a light source member; a mold frame having a rectangular shape disposed on the light source member; a display panel disposed on the mold frame; and a polarizing member disposed on the display panel, the polarizing member including: a polarizing film; and a protective film disposed on the polarizing film, the protective film including: a first protective area overlapping the polarizing film; and a second protective area protruding from the first side and the third side of the first protective area and not overlapping the polarizing film, wherein the mold frame includes: mold side surface portions disposed along the sides of the rectangular frame; a panel support part extending inward from respective upper ends of the mold side surface portions; and mold ribs extending upward from the upper ends of the mold side surface portions of the first side and the third side facing each other, the model ribs having widths smaller than those of the respective mode side surface portions, wherein the display panel is disposed on the panel support part of the mold frame, and wherein the second protective area of the protective film is bent to cover an outer side surface of the mold rib and an outer side surface of the mold side surface portion.

The first side and the third side may be short sides, and the second side and the fourth side may be long sides.

The mold rib may include: a base portion adjacent to the mold side surface portion, the base portion having a uniform width; and a tip portion connected to the base portion, the tip portion having a width smaller than a width of the base portion, a width of the tip portion may decrease in an upward direction.

An outer side surface of a base portion may be aligned flush with an outer side surface of the mold side surface portion, and an inner side surface of the tip portion may be aligned flush with an inner side surface of the base portion.

According to one or more exemplary embodiments of the invention, a mold frame has a rectangular frame shape with a first side, a second side, a third side, and a fourth side, the mold frame including: side surface portions disposed along the sides of the rectangular frame; inner extending portions extending inward from upper ends of the side surface portions of the sides; and ribs having widths smaller than those of the side surface portions, the ribs extending upward from the upper ends of the respective side surface portions of the first side and the third side facing each other.

The width of the rib may be smaller than a width perpendicular to an extending direction of the inner extending portion.

The first side and the third side may be short sides, and the second side and the fourth side may be long sides.

The rib may include: a base portion adjacent to the side surface portion, the base portion having a uniform width; and a tip portion connected to the base portion, the rip portion having a width smaller than a width of the base portion.

A width of the tip portion may decrease in an upward direction.

An outer side surface of the base portion may be aligned flush with an outer side surface of the side surface portion, and an inner side surface of the tip portion may be aligned flush with an inner side surface of the base portion.

According to the exemplary embodiments of the present disclosure, a display device may reduce a tensile force from contraction of a polarizing film applied to a protective film.

Further, according to the exemplary embodiments of the present disclosure, a display device may have a bezel with decreased width, which may even be perceived that the bezel is not substantially present.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 4 is a cross-sectional view taken along a sectional line in FIG. 3.

FIG. 6 is a perspective view of a mold frame according to an exemplary embodiment.

FIG. 14 is a perspective view of a mold frame according to another exemplary embodiment.

FIG. 18 is a perspective view of a mold frame according to another exemplary embodiment.

DETAILED DESCRIPTION

Figure 1:
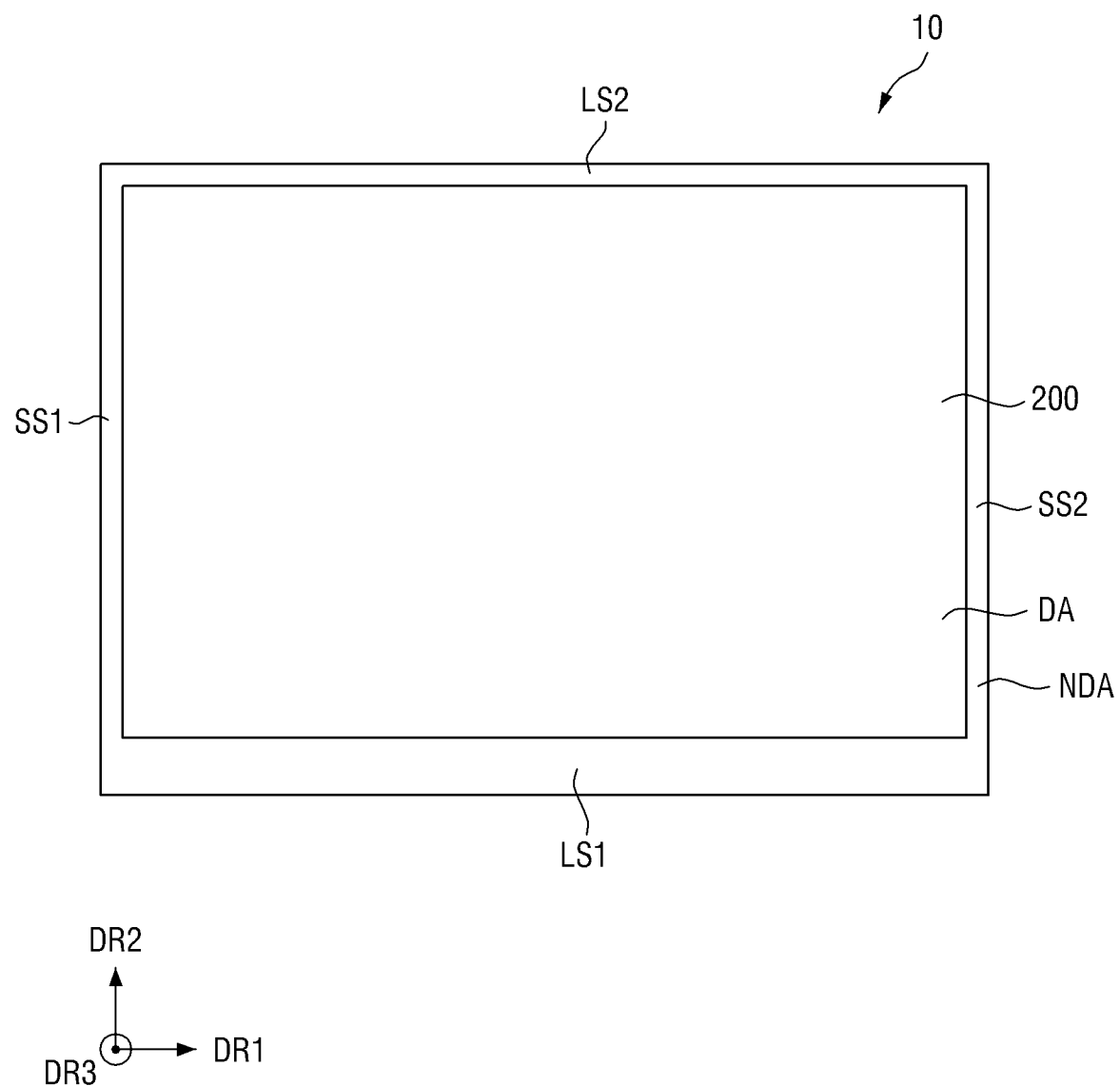
FIG. 1 is a plan view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, specific embodiments will be described with reference to the accompanying drawings.

FIG. 1 is a plan view of a display device according to an exemplary embodiment.

Referring to FIG. 1, a display device 10 according to the exemplary embodiment may be formed in a substantially rectangular shape in a plan view. The display device 10 may have a rectangular shape of which edges are vertical in a plan view. However, the present disclosure is not limited to the above, and the display device 10 may have a rectangular shape of which edges are round in a plan view. The display device 10 may include four sides, wherein two sides of the four sides may be long sides, and the other two sides may be short sides.

In the drawing, a first direction DR1 refers to a lateral direction of the display device 10 in a plan view, and a second direction DR2 refers to a vertical direction of the display device 10 in a plan view. Further, a third direction DR3 refers to a thickness direction of the display device 10. The first direction DR1 and the second direction DR2 vertically cross, and the third direction DR3 vertically crosses both the first direction DR1 and the second direction in a direction crossing a plane in which the first direction DR1 and the second direction DR2 lie. However, the directions mentioned in the exemplary embodiment should be understood as relative directions, and the exemplary embodiment is not limited to the mentioned directions.

Unless otherwise defined, an "upper portion", an "upper surface", and an "upper side" shown with respect to the third direction DR3 refer to a display surface with respect to a display panel 200, and a "lower portion", a "lower surface", and a "lower side" refer to an opposite side of the display surface with respect to the display panel 200.

In the plan view of FIG. 1, a short side positioned on a left side of the display device 10 is referred to as a first short side SS1, a short side positioned on a right side is referred to as a second short side SS2, a long side positioned on a lower side is referred to as a first long side LS1, and a long side positioned on an upper side is referred to as a second long side LS2.

Referring to FIG. 1, the display device 10 may include a display area DA and a non-display area NDA. The display area DA is an area which displays an image or a video, and the non-display area NDA is an area located around the display area DA and in which the image or the video is not displayed. The non-display area NDA may configure a bezel.

In the exemplary embodiment, the non-display area NDA may be disposed to surround all sides of the display area DA. In this case, as shown in FIG. 1, a width of the non-display area NDA of the first long side LS1 of the display device 10 may be greater than widths of the non-display area NDA of other sides SS1, SS2, and LS2. The widths of the non-display area NDA of the other sides SS1, SS2, and LS2 may be substantially the same but are not limited thereto. In another exemplary embodiment, the non-display area NDA may not be substantially present on three sides SS1, SS2, and LS2 among the four sides LS1, LS2, SS1, and SS2 of the display device 10. In still another exemplary embodiment, the non-display area NDA may not be substantially present on all four sides LS1, LS2, SS1, and SS2 in the display device 10 in the plan view.

Figure 2:
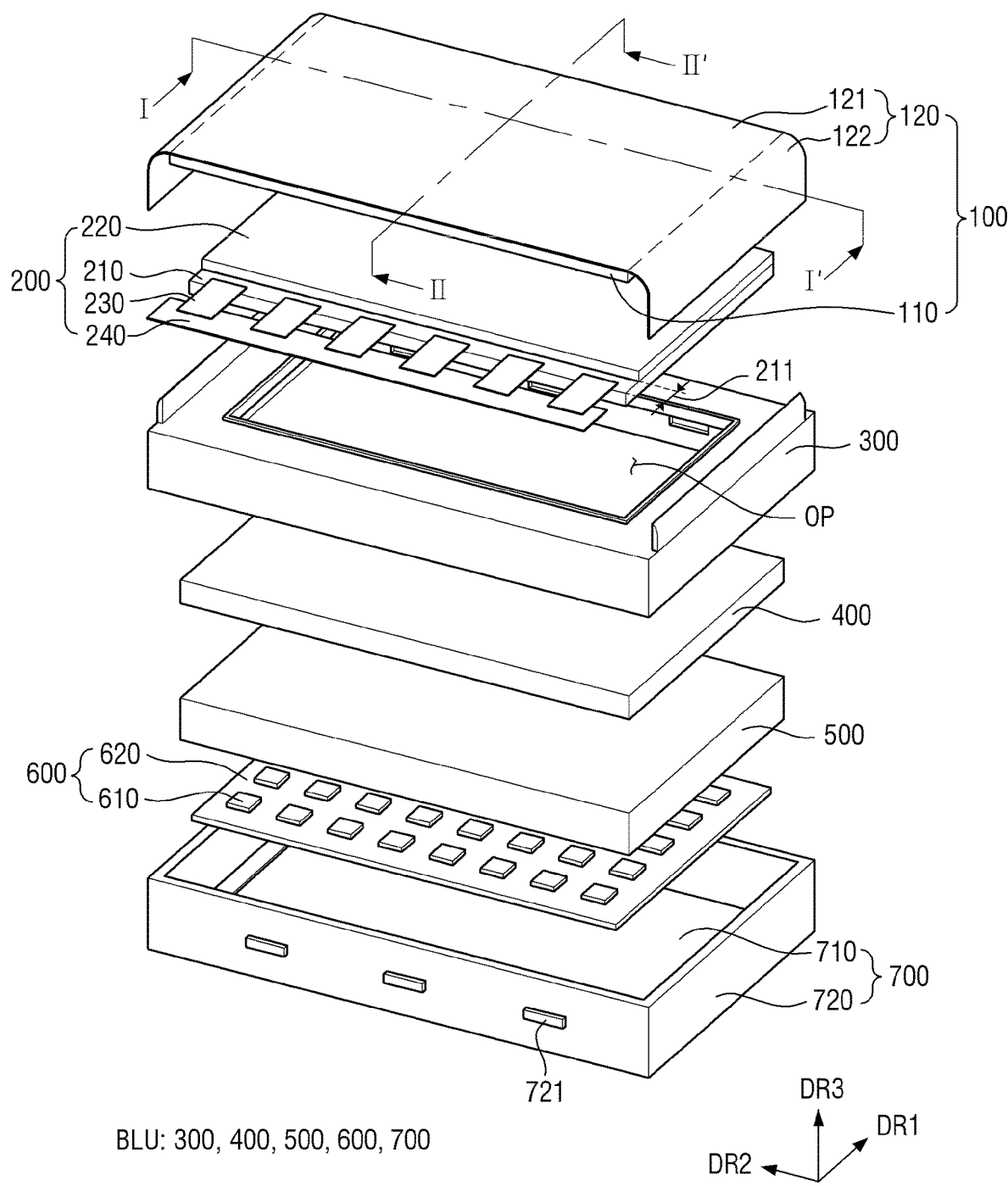
FIG. 2 is an exploded perspective view of the display device in FIG. 1.

FIG. 2 is an exploded perspective view of the display device in FIG. 1.

Referring to FIG. 2, the display device 10 may include a polarizing member 100, the display panel 200 and a backlight unit BLU.

Although the display panel 200 may include various light receiving display panels such as a liquid crystal display panel, an electrowetting display panel, an electrophoretic display panel, a microelectromechanical system (MEMS) display panel, and the like, hereinafter, an example in which the display panel 200 is a liquid crystal display panel will be described.

The display panel 200 may receive light from the backlight unit BLU and may control the transmittance of the received light by alignment of liquid crystals to display an image. The display panel 200 may include a first substrate 210, a second substrate 220 facing the first substrate 210, and a liquid crystal layer 250 interposed between the first substrate 210 and the second substrate 220. The second substrate 220 may be a color filter substrate including a color filter. The first substrate 210 may be a thin film transistor substrate including a thin film transistor as an opposing substrate. However, the present disclosure is not limited to the above, and the color filter may be formed on the first substrate 210. The first substrate 210 may include a substrate protruding part 211 configured to protrude outward from the second substrate 220. The substrate protruding part 211 of the first substrate 210 may provide a space in which an external device may be mounted.

The display panel 200 may further include at least one connection film 230, and a circuit board 240. One end of the connection film 230 may be connected to the substrate protruding part 211 of the first substrate 210, and the other end may be connected to the circuit board 240. The connection film 230 may be formed of a flexible material that can be bent.

When a plurality of connection films 230 (for example, eight connection films 230) are provided, the connection films 230 may be disposed to be spaced apart from each other along an extending direction of the first long side LS1 of the display device 10.

The circuit board 240 may output signals to the display panel 200 or receive signals from the display panel 200 through the connection films 230. In FIG. 2, although the circuit board 240 is illustrated as being positioned on the same plane as the display panel 200 for convenience of description, the circuit board 240 may be disposed at various positions in actual applications. For example, since the connection films 230 are bent, the circuit board 240 may be disposed under the backlight unit BLU or on a side surface of the backlight unit BLU. In this case, the connection films 230 may be bent while partially or entirely surrounding the side surface of the backlight unit BLU on the first long side LS1.

A driving chip (not shown) receives external signals and generates driving signals for driving the display panel 200. The external signals are signals supplied from the circuit board 240 and may include image signals, various control signals, a driving voltage, and the like. The driving chip (not shown) may be mounted on the connection film 230. However, the present disclosure is not limited to the above, and the driving chip (not shown) may also be mounted on the circuit board 240 or the first substrate 210.

The polarizing member 100 may be disposed on the display panel 200. The polarizing member 100 may be disposed on the liquid crystal layer 250 to adjust the transmittance of polarized light which passes through the liquid crystal layer 250. Although not shown, the polarizing member 100 may also be disposed under the liquid crystal layer 250. The polarizing member 100 under the liquid crystal layer 250 may provide polarized light to the liquid crystal layer 250 by polarizing the light provided from the backlight unit BLU. The polarizing member 100 under the liquid crystal layer 250 may be attached to a lower surface of the display panel 200, or provided in the display panel 200.

The polarizing member 100 on the display panel 200 may be attached to an upper surface of the display panel 200. The polarizing member 100 may include a polarizing film 110 and a protective film 120. The polarizing member 100 may be disposed so that the polarizing film 110 may be attached onto the display panel 200, and the protective film 120 may be located at an upper portion of the polarizing member 100.

Hereinafter, the display panel 200 and the polarizing member 100 will be described in detail.

Figure 3:
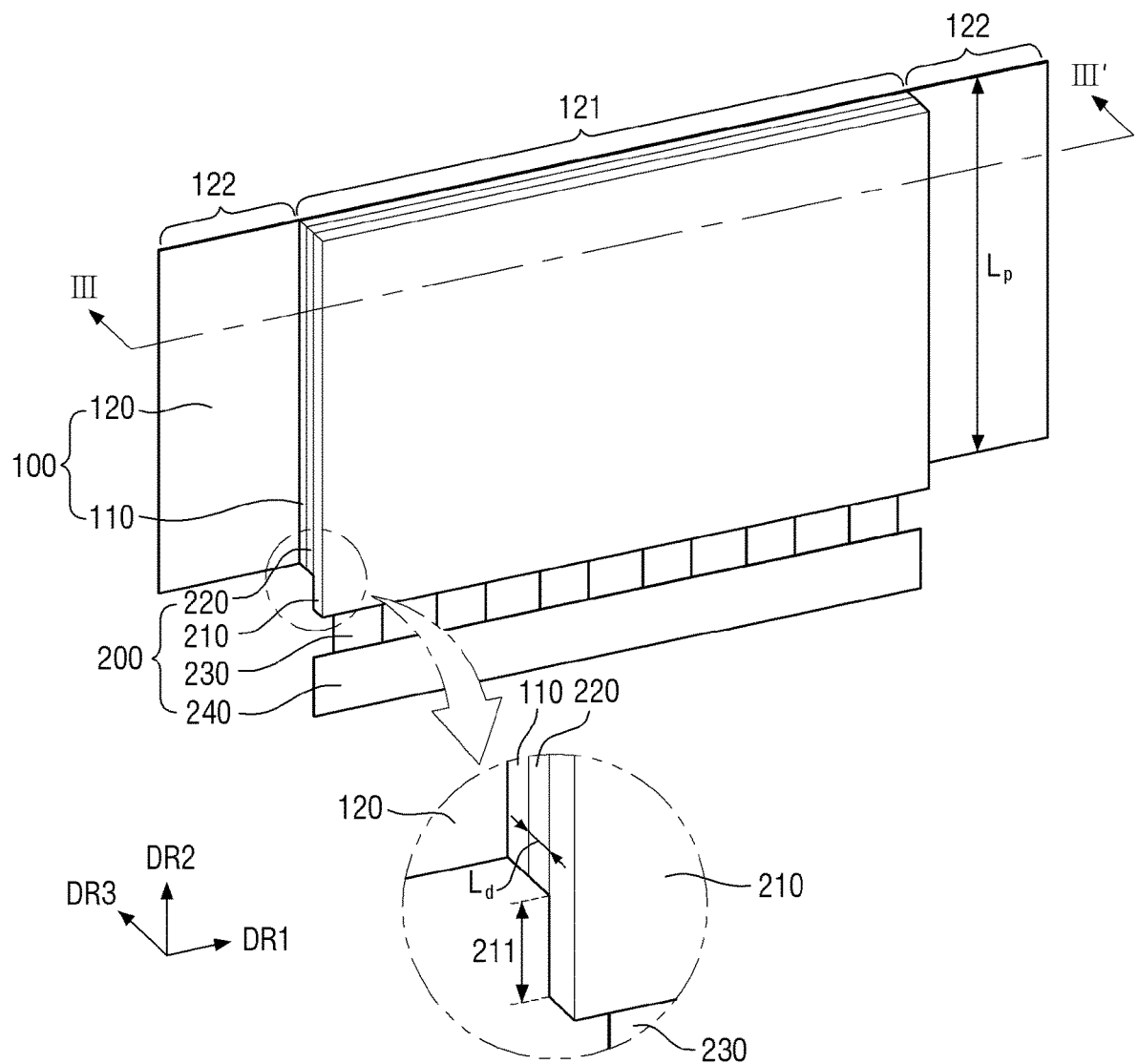
FIG. 3 is a perspective view of a coupled polarizing member and display panel viewed from below.
Figure 5:
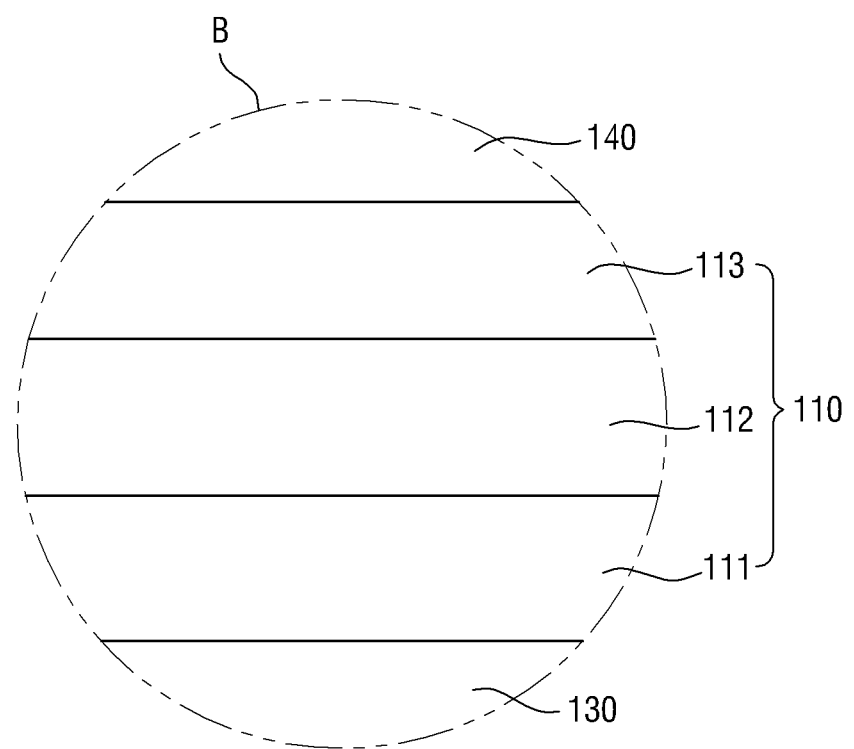
FIG. 5 is an enlarged view of area B in FIG. 4.

FIG. 3 is a perspective view of the coupled polarizing member and display panel viewed from below. FIG. 4 is a cross-sectional view taken along a sectional line in FIG. 3. FIG. 5 is an enlarged view of area B in FIG. 4. A relation between the polarizing member 100 and the display panel 200, and the polarizing member 100 will be described in detail with reference to FIGS. 3, 4, and 5.

The polarizing film 110 may substantially polarize light which passes therethrough, and may include a first protective base material 111, a polarizing material 112, a second protective base material 113, and the like. A detailed description thereof will be described later.

The protective film 120 may protect the polarizing film 110 disposed under the protective film 120. The protective film 120 may be formed of a flexible material. The protective film 120 may be bent. An extending length of the protective film 120 in the first direction DR1 may be greater than an extending length of the polarizing film 110 in the first direction DR1. The protective film 120 may protrude from one side and the other side of the polarizing film 110 in the first direction DR1. With respect to an overlapping relation with the polarizing film 110, the protective film 120 may be classified into a first protective area 121 and a second protective area 122.

The first protective area 121 is an area overlapping the polarizing film 110 in the third direction DR3, and the second protective area 122 may be defined as an area which does not overlap the polarizing film 110 in the third direction DR3, and protrudes from respective sides of the first protective area 121 in the first direction DR1. The second protective area 122 which protrudes from the polarizing film 110 may be bent at both short sides SS1 and SS2 of the display device 10. The second protective area 122 of the polarizing film 110 may surround a side surface of each of the polarizing film 110, the display panel 200, and the backlight unit BLU at the short sides SS1 and SS2. A detailed description thereof will be described later.

Referring to FIG. 3, although the first protective area 121 and the second protective area 122 are illustrated as extending in a straight line for convenience of description, the second protective area 122 may be bent to surround the remaining components disposed under a protective film 120 in actual applications.

An extending length of the second substrate 220 of the display panel 200 in the second direction DR2 may be a second length $L_d$, and an extending length of the protective film 120 of the polarizing member 100 in the second direction DR2 may be a third length $L_p$. In the exemplary embodiment, the second length $L_d$ and the third length $L_p$ may be the same. However, the present disclosure is not limited to the above, and the second length $L_d$ and the third length $L_p$ may be different from each other.

In the exemplary embodiment, one side end of the second substrate 220 in the second direction DR2 and one side end of the protective film 120 in the second direction DR2 may be aligned on the basis of the third direction DR3. Further, the other side end of the second substrate 220 in the second direction DR2 and the other side end of the protective film 120 in the second direction DR2 may also be aligned on the basis of the third direction DR3. However, as described above, since the protective film 120 includes the second protective area 122 that extends from both sides of the first protective area 121 in the first direction DR1, both side ends of the protective film 120 in the first direction DR1 may not be aligned with both side ends of the second substrate 220 in the first direction DR1 on the basis of the third direction DR3, and the protective film 120 may further protrude from both sides thereof in the first direction DR1.

Since the first substrate 210 includes the substrate protruding part 211 configured to protrude in the second direction DR2 more than the second substrate 220 at the first long side LS1, an extending length of the first substrate 210 in the second direction DR2 may be greater than the second length $L_d$. In the first substrate 210, the second substrate 220, and the polarizing member 100 according to the exemplary embodiment, ends of the components in the second direction DR2 may be aligned on the basis of the third direction DR3 at the second long side LS2. Accordingly, although the end of the second substrate 220 and the end of the protective film 120 are aligned on the basis of the third direction DR3 at the first long side LS1, the end of the first substrate 210 and the end of the protective film 120 may not be aligned on the basis of the third direction DR3 and thus the end of the first substrate 210 may protrude outward more than the end of the protective film 120, and the protruding portions may be substantially the same as the substrate protruding part 211.

As described above, although the second protective area 122 is bent while surrounding the side surface of each of the polarizing film 110, the display panel 200, and the backlight unit BLU, when the protective film 120 is viewed from both side surfaces in the first direction DR1 or an upper side of the protective film 120, the protective film 120 may partially expose the first substrate 210.

Referring to FIGS. 4 and 5, the display panel 200 may include the first substrate 210, the second substrate 220, and the liquid crystal layer 250 disposed between the first substrate 210 and the second substrate 220. The liquid crystal layer 250 serves to change a phase of transmitted light. For example, linearly polarized light may be changed to elliptically polarized light, circularly polarized light, or the like according to the degree of phase retardation to be emitted when the linearly polarized light passes through the liquid crystal layer 250. The degree of phase change may be adjusted according to a thickness of the liquid crystal layer 250.

On an edge of the liquid crystal layer 250, a sealing member 231 may be disposed between the first substrate 210 and the second substrate 220 to confine liquid crystal molecules of the liquid crystal layer 250. A light blocking member BM may be disposed on the sealing member 231. The light blocking member BM may be disposed on an upper surface of the sealing member 231 and may be disposed on a lower surface of the second substrate 220. The light blocking member BM may block light which proceeds to an undesired area, and prevent or suppress a light leakage phenomenon. An extending width of the light blocking member BM in the first direction DR1 may be greater than an extending width of the sealing member 231 in the first direction DR1, but is not limited thereto. The light blocking member BM may have a uniform thickness as a whole. The light blocking member BM may be formed of an organic material or a metal material including chromium. For example, the light blocking member BM may be a carbon black matrix or an organic black matrix, but is not limited thereto.

Since the polarizing member 100 is disposed on the display panel 200 and a first adhesive layer 130 is disposed between a lower portion of the polarizing member 100 and an upper portion of the display panel 200, the polarizing member 100 and the display panel 200 may be coupled. Further, a second adhesive layer 140 may be disposed between an upper portion of the polarizing film 110 and a lower portion of the protective film 120 to couple the polarizing film 110 and the protective film 120.

Although not limited to the above, each of the first adhesive layer 130 and the second adhesive layer 140 may include a pressure sensitive adhesive (PSA). Materials having a polymer such as an acrylic polymer, a silicone polymer, polyester, polyurethane, polyamide, polyether, a fluorine polymer, a rubber polymer, or the like as a base polymer may be appropriately selected and used as a material constituting the first adhesive layer 130 and the second adhesive layer 140. Specifically, a material having excellent optical transparency, showing an adhesive characteristic including proper wettability, cohesiveness, and adhesiveness properties, and having excellent weather resistance, heat resistance, or the like such as an acrylic adhesive may be used.

A printed layer 125 may be disposed on the protective film 120. The printed layer 125 may be disposed on an upper surface and/or a lower surface of the protective film 120. The printed layer 125 may be formed by black ink or the like. The printed layer 125 may be disposed on a portion of each of the second protective area 122 of the protective film 120 and the first protective area 121 adjacent to the second protective area 122. The printed layer 125 disposed on the first protective area 121 may partially overlap the light blocking member BM disposed on the second substrate 220 in the third direction DR3. In this case, when a user views the display panel 200 from an upper portion of the protective film 120, a sense of unity between the non-display area of the display panel 200 and the second protective area 122 may be given. However, an area in which the printed layer 125 is disposed is not limited to the above, and the printed layer 125 may not exist.

Although not shown, the upper surface of the protective film 120 may be surface-treated. The surface treatment may strengthen the protective film 120 and/or prevent or suppress glare.

As shown in FIG. 5, the polarizing film 110 may include a polarizing material 112, the first protective base material 111 disposed under the polarizing material 112, and the second protective base material 113 disposed on the polarizing material 112.

The polarizing material 112 of the polarizing film 110 may include a phase retardation film such as a linear polarizing plate and a λ/4 plate (a quarter-wave plate). The polarizing material 112 is not limited to the above, and may be formed by including polyvinyl alcohol (PVA). A polyvinyl alcohol film may be formed of a polyvinyl alcohol-based resin. The polyvinyl alcohol-based resin may be obtained by saponifying, for example, a polyvinyl acetate-based resin.

The first protective base material 111 and the second protective base material 113 protect the polarizing material 112 by covering the polarizing material 112 from both sides in the thickness direction. Each of the first protective base material 111 and the second protective base material 113 may be formed of a film including a thermoplastic resin in which transparency, mechanical strength, thermal stability, moisture barrier properties, isotropy, and the like are excellent. Specific examples of the thermoplastic resin may be triacetyl cellulose (TAC) and the like. However, the present disclosure is not limited to the above, and a cyclic olefin polymer (COP) or the like may be used as a base material of the first protective base material 111.

Although not shown, each of the first protective base material 111 and the second protective base material 113 may be coupled to a surface of the polarizing material 112 by a polyvinyl alcohol-based adhesive resin layer.

Referring to FIG. 2 again, the backlight unit BLU may be disposed under the display panel 200. The backlight unit BLU may include a diffusion plate 500, a light source member 600 (or a light source module), an optical sheet 400, a mold frame 300, and the like, and may include a lower accommodation container 700 (or a bottom chassis) as an accommodation container.

The light source member 600 may include a light source 610 and a printed circuit board 620. The light source 610 may include a plurality of point light sources 610 or linear light sources 610. The point light sources 610 may be light emitting diode (LED) light sources 610. The plurality of light sources 610 may be mounted on the printed circuit board 620 and may receive a driving voltage from the printed circuit board 620. The point light sources 610 which receive the driving voltage from the printed circuit board 620 emit light, and the light emitted from the plurality of light sources 610 may face an upper side, that is, the display panel 200, although the present disclosure is not limited thereto.

The light source 610 according to the exemplary embodiment may be the LED light source 610. The light source 610 may emit light of a specific wavelength. For example, the light source 610 may emit light of a blue wavelength, a near ultraviolet wavelength, and/or an ultraviolet wavelength. In this case, the display device 10 may further include a wavelength conversion member (not shown) configured to convert light of a specific wavelength like the above to white light. The wavelength conversion member (not shown) may be disposed in the light source member 600 and may also be disposed in the display panel 200. In another exemplary embodiment, the LED light source 610 may emit white light by itself.

The diffusion plate 500 may be disposed on the light source member 600. The diffusion plate 500 may diffuse light emitted from the light source 610 to the display panel 200 to prevent or suppress concentration of the light. Accordingly, the diffusion plate 500 may allow the light emitted from the light source 610 to be provided to the display panel 200 with more uniform luminance.

The backlight unit BLU according to the exemplary embodiment may be a direct type backlight unit BLU in which the light source 610 is disposed under the diffusion plate 500, but is not limited thereto, and may be an edge type backlight unit BLU in which the light source 610 is located at a side portion of a light guide plate. In this case, the light guide plate may be disposed instead of the diffusion plate 500.

The optical sheet 400 may be disposed on the diffusion plate 500. The optical sheet 400 may be a prism film, a diffusion film, a micro lens film, a lenticular film, a polarizing film, a reflective polarizing film, a retardation film, or the like. The display device 10 may include a plurality of optical sheets 400 of the same type or different types. When the plurality of optical sheets 400 are applied, the optical sheets 400 may be disposed to overlap each other. A composite film in which two or more optical function layers are integrated may be used as the optical sheet 400.

The lower accommodation container 700 serves to accommodate the optical sheet 400, the diffusion plate 500, the light source member 600, and the like. To this end, the lower accommodation container 700 may include an accommodation space capable of accommodating the above-described members therein. The lower accommodation container 700 may include a bottom surface 710 and a sidewall portion 720 bent and extended upward from edges of the bottom surface 710 along the periphery of the bottom surface 710. The light source member 600, the diffusion plate 500, the optical sheet 400, and the like may be sequentially stacked on the bottom surface 710 of the lower accommodation container 700 in an inner space of the sidewall portion 720 of the lower accommodation container 700.

The mold frame 300 may be disposed on the optical sheet 400. The mold frame 300 serves to dispose the display panel 200 on the mold frame 300, and separate the lower accommodation container 700, the light source member 600, the diffusion plate 500, and the optical sheet 400 which are located under the mold frame 300 from the display panel 200 at a predetermined interval in the third direction DR3. The mold frame 300 will be described in detail with reference to FIG. 6.

FIG. 6 is a perspective view of the mold frame according to an exemplary embodiment.

The mold frame 300 may have a rectangular frame shape in a plan view. The mold frame 300 may be formed of a plastic material such as polycarbonate or the like although the present disclosure is not limited thereto.

The mold frame 300 may include a hole OP (or an opening) in a center thereof. The hole OP may have a substantially rectangular planar shape. The mold frame 300 may have a substantially uniform width at the first short side SS1, the second short side SS2, the first long side LS1, and the second long side LS2.

Hereinafter, the mold frame 300 will be described in detail.

Referring to FIG. 6, a panel support part 320 of the mold frame 300 according to the exemplary embodiment may have a rectangular frame shape in a plan view at the four sides of the display device 10, and an extending width of the panel support part 320 in the first direction DR1 at the first short side SS1 and the second short side SS2 and an extending width of the panel support part 320 in the second direction DR2 at the first long side LS1 and the second long side LS2 may be the same. However, the present disclosure is not limited to the above, widths of the panel support part 320 at the sides LS1, LS2, SS1, and SS2 may be different, and some of the panel support part 320 located at the four sides LS1, LS2, SS1, and SS2 may have the same width.

A mold side surface portion 310 may be connected to outer ends of the panel support parts 320 at the four sides LS1, LS2, SS1, and SS2, and the panel support parts 320 at the four sides LS1, LS2, SS1, and SS2 may be connected to each other. Accordingly, the mold frame 300 may include an accommodation space surrounded by the mold side surface portion 310. In the accommodation space, the optical sheet 400, the diffusion plate 500, the light source member 600, the lower accommodation container 700, and the like may be accommodated.

As shown in FIG. 6, a side surface groove 311 may be located at an inner side of the mold side surface portion 310. The side surface groove 311 may be formed in a substantially rectangular shape, but is not limited thereto. The side surface groove 311 maybe provided as a plurality of side surface grooves 311 which may be disposed at the sides LS1, LS2, SS1, and SS2 along extending directions of the mold side surface portion 310, and the side surface grooves 311 may be spaced apart from each other. In FIG. 6, although the side surface groove 311 is shown at only the inner side of the mold side surface portion 310 at the second long side LS2, the plurality of side surface grooves 311 are also disposed at the remaining sides LS1, SS1, and SS2. Although the number of side surface grooves 311 disposed in the mold side surface portion 310 at the first long side LS1 and the number of side surface grooves 311 disposed in the mold side surface portion 310 at the second long side LS2 are the same, and the number of side surface grooves 311 disposed in the mold side surface portion 310 at the first short side SS1 and the number of side surface grooves 311 disposed in the mold side surface portion 310 at the second short side SS2 are the same, the number of side surface grooves 311 disposed in the mold side surface portion 310 at each of the first long side LS1 and the second long side LS2 and the number of side surface grooves 311 disposed in the mold side surface portion 310 at each of the first short side SS1 and the second short side SS2 may be different. However, the present disclosure is not limited to the above, and the number of side surface grooves 311 disposed at the sides LS1, LS2, SS1, and SS2 may be the same.

Although the mold side surface portions 310 and the panel support parts 320 may be located at all the four sides, mold ribs 330 according to the exemplary embodiment may be located at only the first short side SS1 and the second short side SS2. The mold ribs 330 may continuously extend in the second direction DR2 on the mold side surface portion 310. However, the present disclosure is not limited to the above, and the mold ribs 330 may also be located at the first long side LS1 and/or the second long side LS2 in addition to the first short side SS1 and the second short side SS2, and may not continuously extend in the second direction DR2.

A first length $L_r$ may be an extending length of the mold rib 330 in the second direction DR2. The first length $L_r$ according to the exemplary embodiment may be smaller than an extending length of the mold side surface portion 310 or the panel support part 320 in the second direction DR2. Accordingly, in the panel support parts 320 at the first short side SS1 and the second short side SS2, the mold ribs 330 may not be disposed on both ends in the second direction DR2. Further, the first length $L_r$ may be greater than a length of each of holes at the first short side SS1 and the second short side SS2 in the second direction DR2 defined by the panel support parts 320. However, the present disclosure is not limited to the above, and the first length $L_r$ may be the same as the extending length of the mold side surface portion 310 or the panel support part 320 in the second direction DR2, or smaller than or equal to an extending length of the hole in the second direction DR2.

Figure 7:
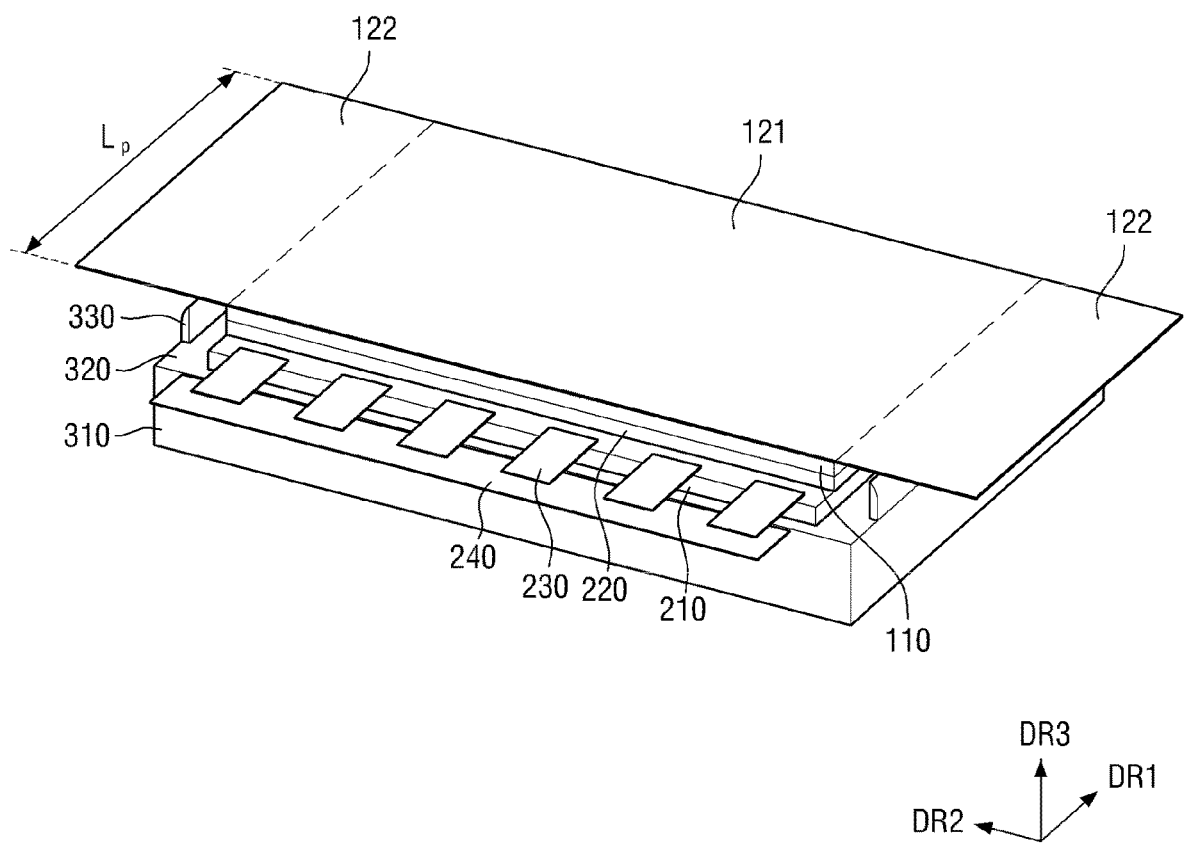
FIG. 7 is a perspective view illustrating the polarizing member, the display panel, and the mold frame coupled according to an exemplary embodiment.
Figure 8:
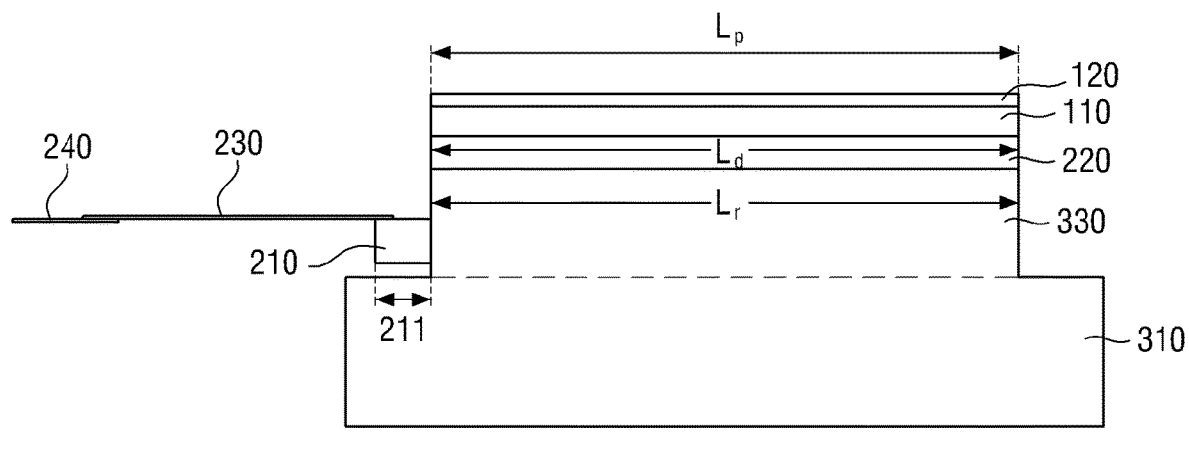
FIG. 8 is a side view of FIG. 7.
Figure 9:
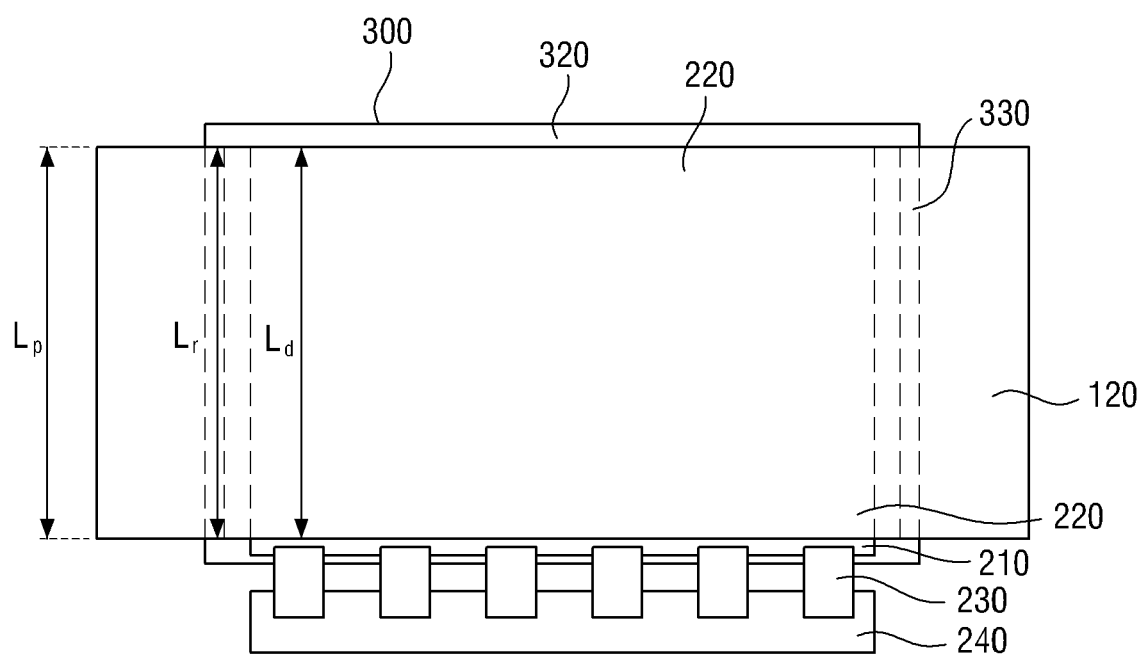
FIG. 9 is a plan view of components in FIG. 7, as viewed from an upper portion of the polarizing member.

FIG. 7 is a perspective view illustrating the polarizing member, the display panel, and the mold frame coupled according to an exemplary embodiment. FIG. 8 is a side view of FIG. 7. FIG. 9 is a plan view of components in FIG. 7, as viewed from an upper portion of the polarizing member. A relation between the polarizing member 100, the display panel 200, and the mold frame 300 will be described with reference to FIGS. 7, 8, and 9.

In FIGS. 7, 8, and 9, although the first protective area 121 and the second protective area 122 are illustrated as being disposed on the same plane for convenience of description, the second protective area 122 may be bent in actual applications.

Referring to FIGS. 7, 8, and 9, in the exemplary embodiment, the first length $L_r$ and the third length $L_p$ may be the same. Further, as described above, since the second length $L_d$ and the third length $L_p$ are the same, all the first length $L_r$, the second length $L_d$, and the third length $L_p$ may be the same. However, the present disclosure is not limited to the above, and the first length $L_r$, the second length $L_d$, and the third length $L_p$ may be different from each other or only some of the first length $L_r$, the second length $L_d$, and the third length $L_p$ may be the same. Accordingly, at one side and the other side in the second direction DR2, ends of the protective film 120, the second substrate 220, and the mold rib 330 may be present on the same plane.

In this case, as shown in FIG. 8, when a configuration in which the polarizing member 100, the display panel 200, and the mold frame 300 are coupled is view from the one side or the other side of the first direction DR1, the mold rib 330 may cover most of the display panel 200. In other words, only the substrate protruding part 211 of the first substrate 210 may protrude to outer sides in the second direction DR2 of the mold rib 330 from one side and the other side in the second direction DR2 of the mold rib 330, and other portions of the display panel 200 may be covered by the mold rib 330 and thus may not be visible. However, the present disclosure is not limited to the above, and according to the first length $L_r$, the second length $L_d$, and the third length $L_p$, portions of the display panel 200 other than the substrate protruding part 211 may protrude from the mold rib 330 in the second direction DR2, and all the display panel 200 including the substrate protruding part 211 may be covered by the mold rib 330 in second direction DR2 and thus may not be visible.

Although not shown, the second protective area 122 of the protective film 120 may be bent to cover an outer side surface of the mold rib 330 and the outer side surface of the mold side surface portion 310. Since the third length $L_p$ according to the exemplary embodiment may be the same as the first length $L_r$ and the second length $L_d$, in a state in which the second protective area 122 is bent, when the coupled components are viewed from one side or the other side in the first direction DR1, the remaining components disposed in the second protective area 122 may not be visible.

As shown in FIG. 9, the protective film 120 according to the exemplary embodiment may overlap most of the polarizing film 110, the display panel 200, and the mold frame 300 disposed under the protective film 120 in the third direction DR3. When all the first length $L_r$, the second length $L_d$, and the third length $L_p$ are the same, and ends of the protective film 120, the second substrate 220, and the mold rib 330 are present on the same plane, the mold rib 330 and the second substrate 220 may not be visible from the outside.

In other words, since the extending length of the protective film 120 according to the exemplary embodiment in the first direction DR1 may be greater than an extending length of each of the polarizing film 110 the display panel 200, and the mold frame 300 disposed under the protective film 120 in the first direction DR1, a portion protruding from the protective film 120 in the first direction DR1 may not be present. Further, when all the first length $L_r$, the second length $L_d$, and the third length $L_p$ are the same, and ends of the protective film 120, the second substrate 220, and the mold rib 330 are present on the same plane at one side and the other side in the second direction DR2, the second substrate 220 and the mold rib 330 may completely overlap the protective film 120 in the third direction DR3. Accordingly, when the protective film 120 is viewed from an upper portion of the protective film 120, the mold rib 330 and the second substrate 220 may not be visible. However, the present disclosure is not limited to the above, and the second substrate 220 and the mold rib 330 may be partially visible according to the first length $L_r$, the second length $L_d$, and the third length $L_p$.

In the exemplary embodiment, portions of the panel support parts 320 of the mold frame 300 at the first long side LS1 and the second long side LS2, and some areas of the first substrate 210 at the first long side LS1 protrude to outer sides of the protective film 120 in the second direction DR2 and thus may be visible, even when the protective film 120 is viewed from the upper portion of the protective film 120. However, the present disclosure is not limited to the above, and the components may not be visible according to the third length $L_p$.

Hereinafter, a cross-sectional structure of the display device 10 will be described. First, the cross-sectional structure of the display device 10 at the short sides will be described.

Figure 10:
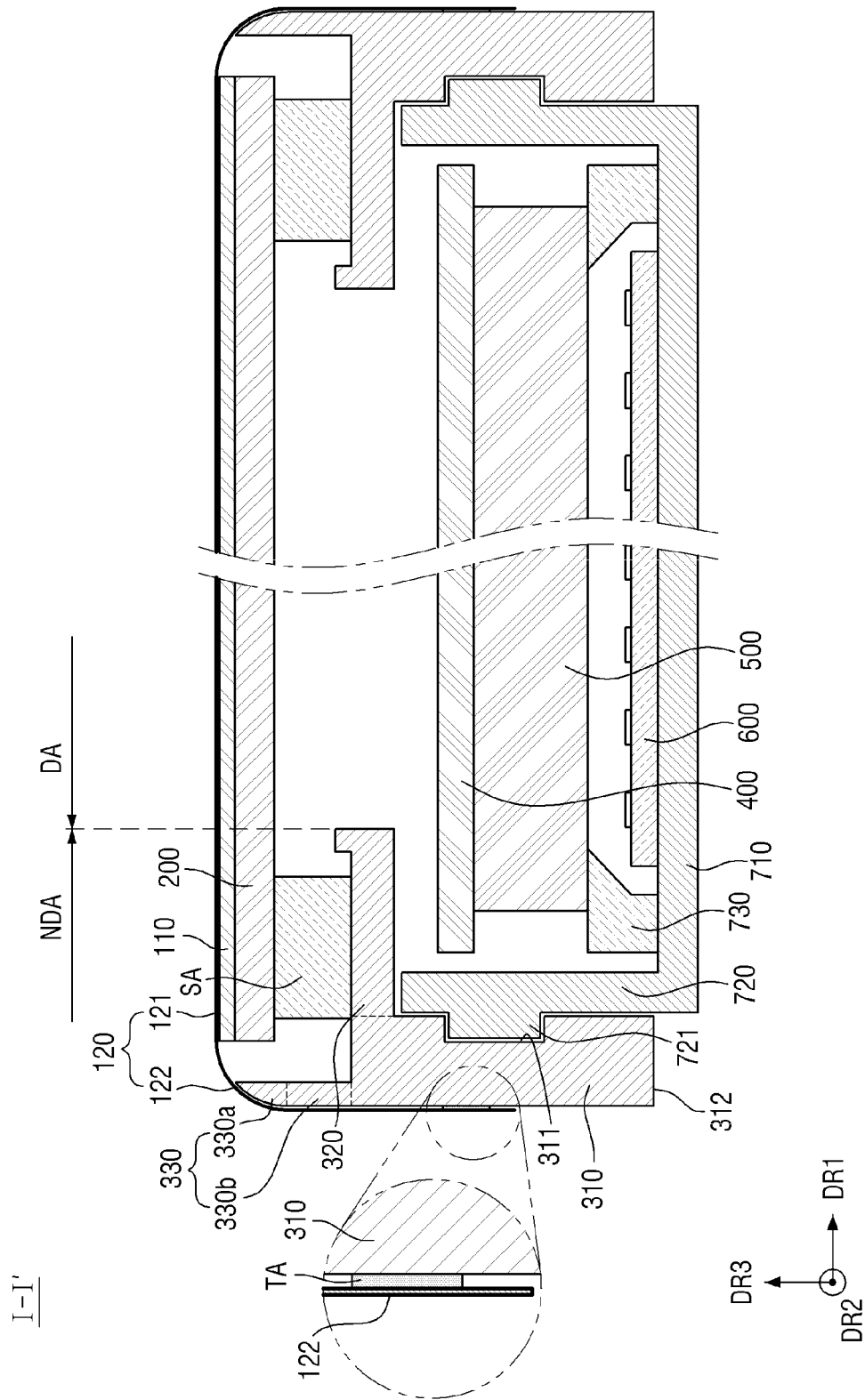
FIG. 10 is a cross-sectional view of a short side of a display device taken along a sectional line I-I' in FIG. 2.
Figure 11:
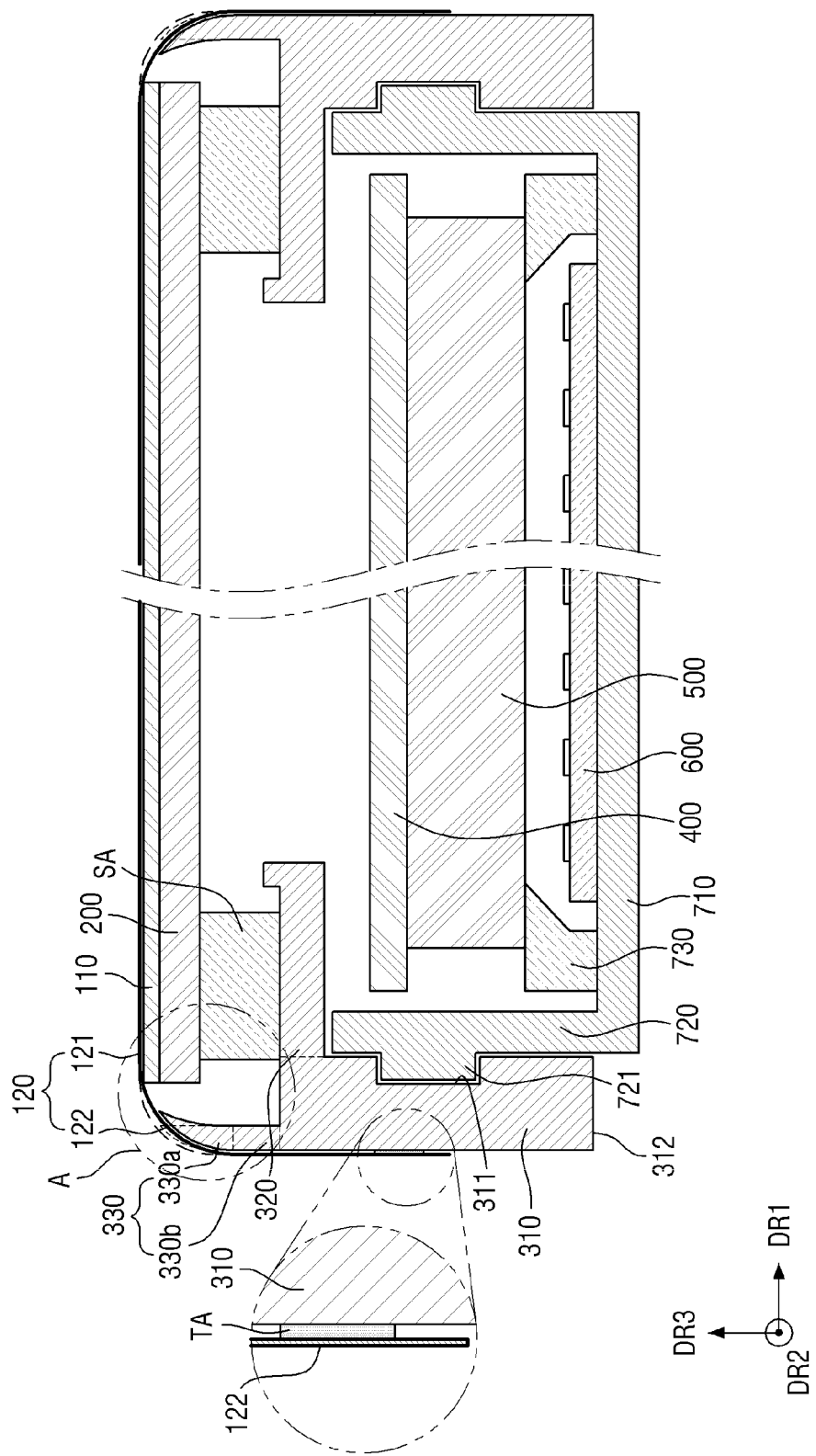
FIG. 11 is a cross-sectional view illustrating a change according to contraction of the polarizing film in FIG. 10.
Figure 12:
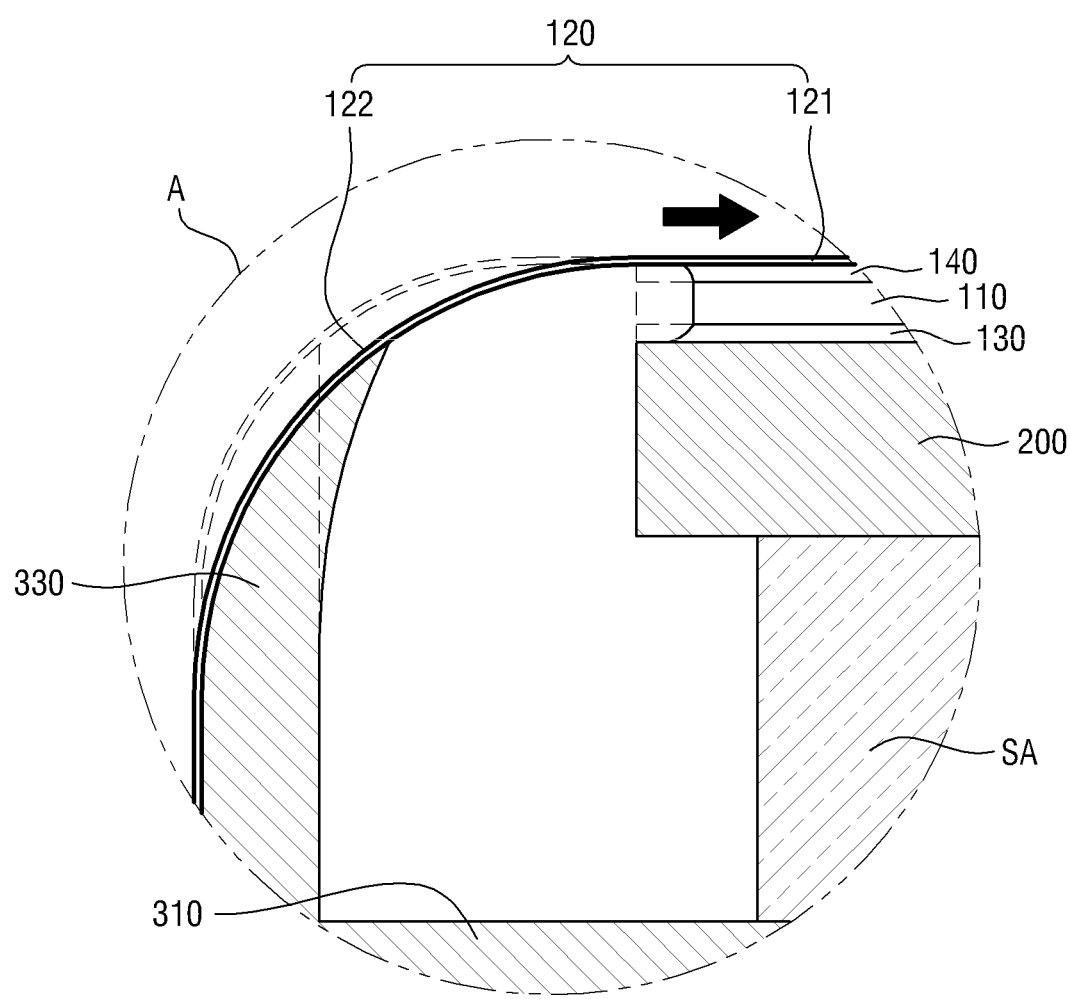
FIG. 12 is an enlarged view of area A in FIG. 11.

FIG. 10 is a cross-sectional view of a short side of a display device taken along a sectional line I-I' in FIG. 2. FIG. 11 is a cross-sectional view illustrating a change according to contraction of the polarizing film in FIG. 10. FIG. 12 is an enlarged view of area A in FIG. 11. The shape of the mold frame 300, the relation between the configurations of the display device 10 and a change according to contraction of the polarizing film 110 will be described with reference to FIGS. 10, 11, and 12.

As shown in FIGS. 10 and 11, in a space surrounded by the sidewall portion 720 of the lower accommodation container 700, the light source member 600 may be disposed on the bottom surface 710 of the lower accommodation container 700. In the lower accommodation container 700, supports 730 may be disposed at edges of the bottom surface 710 along a periphery of the bottom surface 710 of the lower accommodation container 700. A thickness of the support 730 may be greater than a thickness of the light source member 600. The diffusion plate 500 may be disposed on the supports 730, and since the thickness of the support 730 is greater than the thickness of the light source member 600, the diffusion plate 500 may be disposed to be spaced apart from the light source member 600 at a predetermined interval in the third direction DR3. When the diffusion plate 500 is disposed to be spaced apart from the light source member 600 at the predetermined interval, damage to the diffusion plate 500 due to heat dissipated from the light source 610 may be prevented or reduced.

The optical sheet 400 may be disposed on the diffusion plate 500. The optical sheet 400 may protrude toward the adjacent sidewall portion 720 of the lower accommodation container 700 more than the diffusion plate 500. However, the present disclosure is not limited to the above.

The lower accommodation container 700 may include sidewall protruding portions 721 configured to protrude toward the mold frame 300 in a direction toward an outer side of the sidewall portion 720, that is, the first direction DR1. The sidewall protruding portion 721 of the sidewall portion 720 of the lower accommodation container 700 and the side surface groove 311 of the side surface portion of the mold frame 300 may be coupled to each other. A description thereof will be described later.

The mold frame 300 may be disposed at the outer side of the sidewall portion 720 of the lower accommodation container 700. The mold frame 300 may include the mold side surface portions 310, the panel support parts 320, and the mold ribs 330.

The mold side surface portion 310 may be disposed at the outer side of the sidewall portion 720 of the lower accommodation container 700 to face the sidewall portion 720. In the space surrounded by the mold side surface portion 310, that is, in the mold side surface portion 310, the lower accommodation container 700, the light source member 600, the support 730, the diffusion plate 500, the optical sheet 400, and the like may be disposed.

The mold side surface portion 310 may include the side surface groove 311 disposed in the inner side surface of the mold side surface portion 310. The side surface groove 311 may be a portion recessed by a predetermined width (or a predetermined depth) toward an outer side surface of the side surface portion from the inner side surface of the side surface portion. A position at which the side surface groove 311 is located and a size of the side surface groove 311 may correspond to a position and size of the sidewall protruding portion 721 of the lower accommodation container 700. As the sidewall protruding portion 721 of the lower accommodation container 700 is inserted into the side surface groove 311, the mold frame 300 may be fixed to the lower accommodation container 700. Coupling between the sidewall protruding portion 721 of the lower accommodation container 700 and the side surface groove 311 of the mold frame 300 may have a hook-coupled shape, but is not limited thereto.

In the exemplary embodiment, a width of the side surface groove 311 in the third direction DR3 may be slightly greater than a width of the sidewall protruding portion 721 corresponding thereto in the third direction DR3. When the polarizing film 110 contracts, a tensile force may be applied to the protective film 120, and since the protective film 120 is fixed to an outer side of the side surface portion of the mold frame 300, the tensile force may also be applied to the mold frame 300 in an upward direction. As described above, when the width of the side surface groove 311 in the third direction DR3 is greater than the width of the sidewall protruding portion 721 in the third direction DR3, the mold frame 300 itself may slightly move in an upward direction. Accordingly, the tensile force applied to the protective film 120 due to the contraction of the polarizing film 110 may be reduced.

In the exemplary embodiment, a lower end (or a lower surface) of the mold side surface portion 310 may form a step height with respect to a lower surface of the bottom surface 710 of the lower accommodation container 700. The lower end of the mold side surface portion 310 may be located at a higher level than the lower surface of the bottom surface 710 of the lower accommodation container 700, and the lower accommodation container 700 may protrude downward with respect to the lower end of the mold side surface portion 310.

The panel support part 320 may extend inward from an upper end of the mold side surface portion 310. A thickness of the panel support part 320 (a width in the third direction DR3) may be 0.9 mm to 1.1 mm, but is not limited thereto. The panel support part 320 configured to extend inward from the upper end of the mold side surface portion 310 may overlap the sidewall portion 720 of the lower accommodation container 700, portions of the optical sheet 400 and the diffusion plate 500 adjacent to the sidewall portion 720, and the support 730 in the thickness direction at a lower portion of the panel support part 320. Further, the panel support part 320 may partially overlap a support member SA and the display panel 200 in the thickness direction at an upper portion thereof.

The mold rib 330 according to the exemplary embodiment may extend upward from the upper end of the mold side surface portion 310. The outer side surface of the mold rib 330 may be aligned flush with the outer side surface of the mold side surface portion 310. An inner side surface of the mold rib 330 forms a straight line shape in an upward direction. The support member SA and the display panel 200 may be disposed at an inner side of the mold rib 330.

The mold rib 330 according to the exemplary embodiment may include a base portion 330b and a tip portion 330a connected to the base portion 330b. The base portion 330b may be connected to the mold side surface portion 310, and have a uniform thickness (a width in the first direction DR1). The base portion 330b of the mold rib 330 may have a thickness of 0.4 mm to 0.6 mm in the first direction DR1, and have a thickness smaller than the width of the mold side surface portion 310 in the first direction DR1, but is not limited thereto. The thickness (the width in the first direction DR1) of the base portion 330b may be smaller than an extending length of the base portion 330b in the third direction DR3. Further, the thickness (the width in the first direction DR1) of the base portion 330b of the mold rib 330 may be smaller than a thickness of the panel support part 320 in the third direction DR3.

The tip portion 330a may be connected to the base portion 330b and have a thickness (a width in the first direction DR1) smaller than the thickness (the width in the first direction DR1) of the base portion 330b. The thickness of the base portion 330b may decrease in an upward direction. An inner side surface of the tip portion 330a and an inner side surface of the base portion 330b may be aligned flush. An outer side surface of the tip portion 330a may have a round shape.

The support member SA may be located on the panel support part 320. The support member SA may prevent or alleviate the transference of a shock or the like between the backlight unit BLU and the display panel 200. The support member SA may be a foam pad and have an elastic force although the present disclosure is not limited thereto.

The display panel 200 may be disposed on the support member SA. A portion of the display panel 200 overlapping the support member SA and the panel support part 320 of the mold frame 300 in the thickness direction may be a non-display area. However, the present disclosure is not limited to the above. An inner side of the non-display area may be a display area.

The polarizing member 100 may be located on the display panel 200. The display panel 200 and the polarizing film 110 of the polarizing member 100 disposed on the display panel 200 may be aligned in the third direction DR3. However, the present disclosure is not limited to the above, and the display panel 200 and the polarizing film 110 may not be aligned in the third direction DR3, and the display panel 200 may protrude from outer sides in the first direction DR1 more than the polarizing film 110, or the polarizing film 110 may protrude from the outer sides in the first direction DR1 more than the display panel 200. The protective film 120 of the polarizing member 100 disposed on the polarizing film 110 may be classified into the first protective area 121 and the second protective area 122, and the second protective area 122 may extend from the first protective area 121.

The protective film 120 disposed on the polarizing film 110 may be bent so that the second protective area 122 configured to extend outward from the first protective area 121 in the first direction DR1 may surround the outer side surface of the mold rib 330 and the mold side surface portion 310. The second protective area 122 may be bent to cover side surfaces of each of the polarizing film 110, the display panel 200, and the backlight unit BLU at the first short side SS1 and the second short side SS2, and protect components located at an inner side thereof. In this case, other components configured to accommodate or protect the components may not be necessary. Accordingly, a user may recognize that the bezel is not substantially present at the first short side SS1 and the second short side SS2 when the display device 10 according to the exemplary embodiment having the above-described shape is used.

The second protective area 122 may extend to the outer side surface of the mold side surface portion 310, and a bonding member TA may be disposed between an end of the second protective area 122 and the mold side surface portion 310 configured to physically come into contact with the end of the second protective area 122. The bonding member TA may be, for example, a double-sided adhesion tape. The bonding member TA is at least partially attached to each of an inner side surface of the end of the second protective area 122 and the outer side surface of the mold side surface portion 310 overlapping the end of the second protective area 122 in the first direction DR1, and the bonding member TA couples the end of the second protective area 122 and the outer side surface of the mold side surface portion 310 overlapping the end of the second protective area 122 in the first direction DR1. However, a method of coupling the second protective area 122 and the mold side surface portion 310 and a position of the bonding member TA are not limited to the above.

Referring to FIG. 12 again, when the polarizing film 110 contracts and thus an end of the polarizing film 110 moves inward, the protective film 120 on the polarizing film 110 may also receive a tensile force to the inner side in the first direction DR1. In this case, as described above, since the mold rib 330 according to the exemplary embodiment may have an extending length in the third direction DR3 greater than a thickness thereof in the first direction DR1, and may be formed of a plastic material having an elastic force such as polycarbonate or the like, the mold rib 330 may be bent inward. Since the mold rib 330 is bent inward, the tensile force applied to the protective film 120 may be reduced. Accordingly, an occurrence of a crack or the like in the protective film 120 may be prevented or reduced.

As shown in FIG. 12, the first adhesive layer 130 may be disposed between the polarizing film 110 and the display panel 200, and the second adhesive layer 140 may be disposed between the polarizing film 110 and the protective film 120. The first adhesive layer 130 and the second adhesive layer 140 may respectively couple the polarizing film 110 and the display panel 200, and the polarizing film 110 and the protective film 120. However, a method of coupling the components is not limited to the above.

As the polarizing film 110 contracts, the first adhesive layer 130, the polarizing film 110, the second adhesive layer 140, and the display panel 200 which are aligned in the third direction DR3 may no longer be aligned in the third direction DR3. Since the polarizing film 110 contracts and thus an end of the polarizing film 110 moves inward, and the display panel 200 is not influenced by the contraction of the polarizing film 110, an end of the first adhesive layer 130 disposed between the display panel 200 and the polarizing film 110 may be inclined with respect to the third direction DR3. Further, as the polarizing film 110 contracts, the protective film 120 may also receive the tensile force to the inner side in the first direction DR1. Since an end of the protective film 120 is also fixed to the mold side surface portion 310 of the mold frame 300, a portion of the protective film 120 coupled to the polarizing film 110 may not move as much as the polarizing film 110 contracts. Accordingly, an end of the second adhesive layer 140 may also be inclined with respect to the third direction DR3. However, as described above, the mold rib 330 may be bent inward, and accordingly, the protective film 120 may move a predetermined distance in a direction in which the polarizing film 110 contracts. Accordingly, an inclination degree of the end of the second adhesive layer 140 with respect to the third direction DR3 may be smaller than an inclination degree of the end of the first adhesive layer 130.

Hereinafter, the cross-sectional structure of the display device 10 at the long sides will be described.

Figure 13:
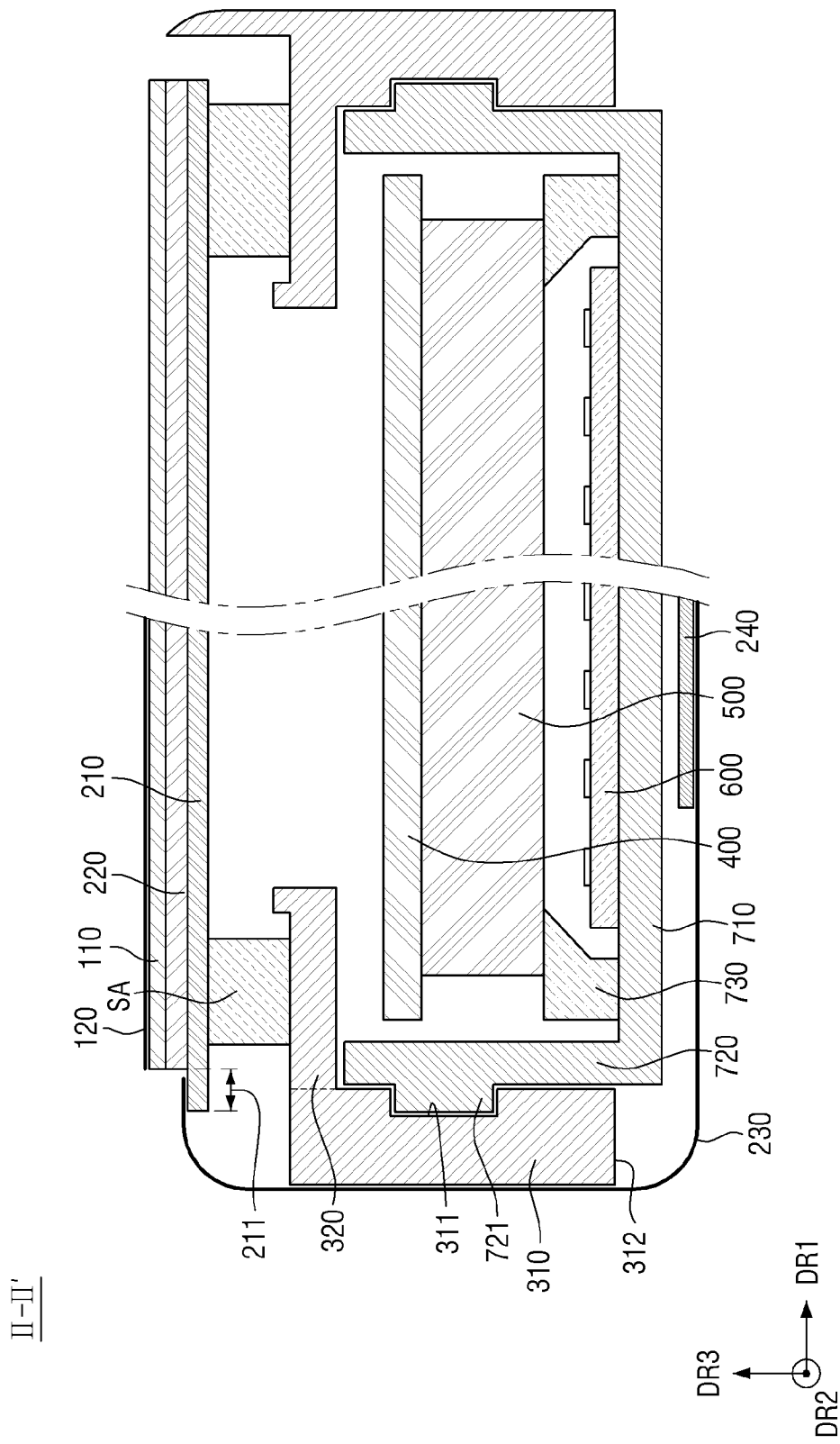
FIG. 13 is a cross-sectional view taken along a sectional line II-IF in FIG. 2.

FIG. 13 is a cross-sectional view taken along a sectional line II-IF in FIG. 2.

Referring to FIG. 13, the cross-sectional view taken along the sectional line II-IF in FIG. 2 may have a shape similar to that in the cross-sectional view taken along a sectional line I-I' in FIG. 2. However, in the protective film 120 according to the exemplary embodiment, since the second protective area 122 that extends from the first protective area 121 extends in only the first direction DR1, and does not extend in the second direction DR2, in FIG. 13, the second protective area 122 which extends from the first protective area 121 and is bent to surround the side surface of each of the display panel 200 and the backlight unit BLU may not be illustrated. Accordingly, the protective film 120 may be only shown on the polarizing film 110. Accordingly, the bonding member TA may be omitted at an outer side of the mold side surface portion 310 at the first long side LS1 and the second long side LS2. Further, as described above with reference to FIG. 6, the mold rib 330 according to the exemplary embodiment is not disposed at the first long side LS1 and the second long side LS2, and thus may not be illustrated in the cross-sectional view in FIG. 13.

At the first long side LS1, one side end of the connection film 230 may be coupled to the substrate protruding part 211 of the first substrate 210 and bent while surrounding the side surface of each of the first substrate 210 and the backlight unit BLU at the first long side LS1. The other side end of the connection film 230 may be connected to the circuit board 240, and as the connection film 230 is bent, the circuit board 240 may be located under the lower accommodation container 700.

Since the remaining components are substantially the same as the contents described in FIGS. 10, 11, and 12, overlapping descriptions will be omitted.

Hereinafter, other exemplary embodiments of the display device 10 will be described. In embodiments to be described below, descriptions of components the same as those in the above-described embodiment will be omitted or simplified, and differences will be mainly described.

Figure 15:
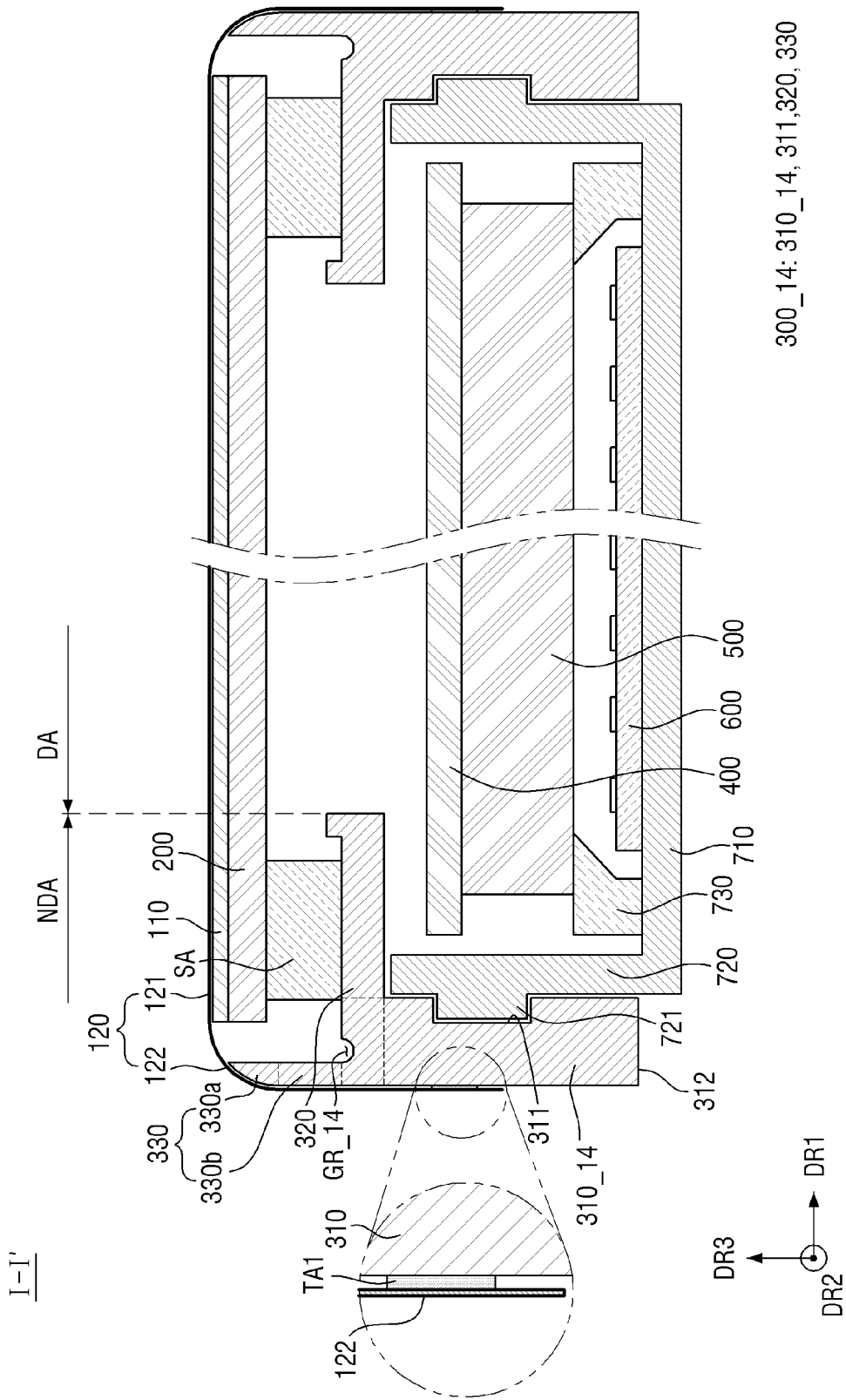
FIG. 15 is a cross-sectional view of a short side of a display device taken along a sectional line I-I' in FIG. 2 according to another exemplary embodiment.
Figure 16:
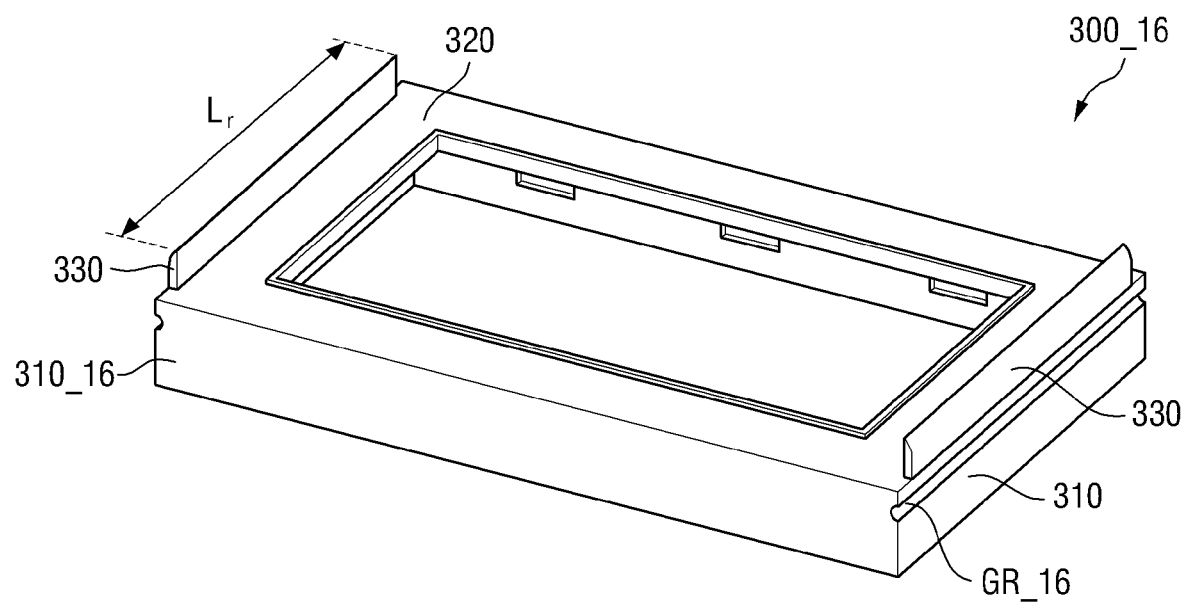
FIG. 16 is a perspective view of a mold frame according to still another exemplary embodiment.
Figure 17:
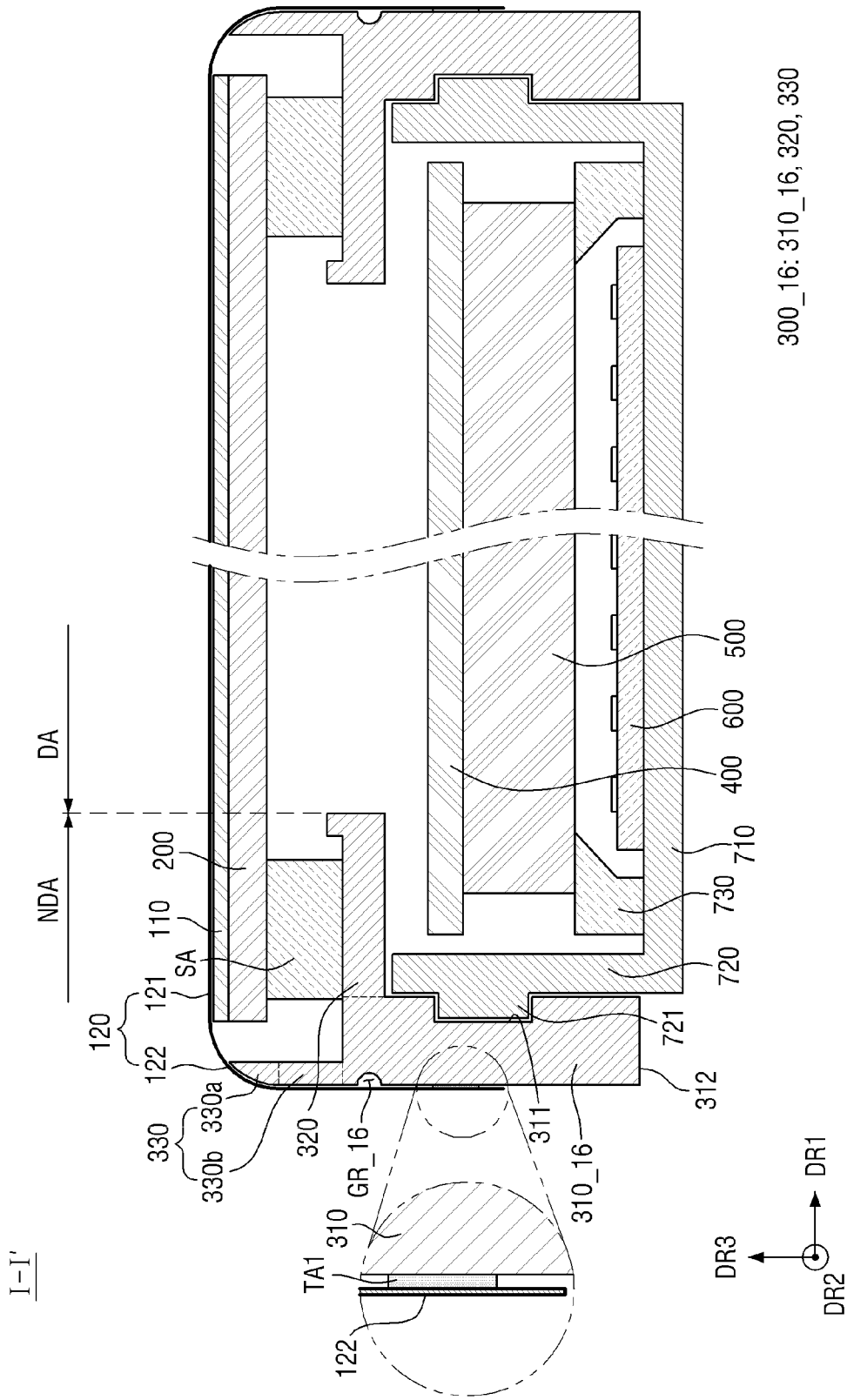
FIG. 17 is a cross-sectional view of a short side of a display device taken along a sectional line I-I' in FIG. 2 according to still another exemplary embodiment.

FIG. 14 is a perspective view of a mold frame according to another exemplary embodiment. FIG. 15 is a cross-sectional view of a short side of a display device taken along a sectional line I-I' in FIG. 2 according to another exemplary embodiment. FIG. 16 is a perspective view of a mold frame according to still another exemplary embodiment. FIG. 17 is a cross-sectional view of a short side of a display device taken along a sectional line I-I' in FIG. 2 according to still another exemplary embodiment.

FIGS. 14, 15, 16, and 17 illustrate that the mold frame 300 may include other components and positions at which the components are disposed may vary.

Referring to FIGS. 14 and 15, FIGS. 14 and 15 illustrate that a mold frame 300_14 may include a first auxiliary groove GR_14 and the first auxiliary groove GR_14 may be disposed on a mold side surface portion 310_14 at an inner side of a mold rib 330. That is, the mold frame 300_14 may include the mold side surface portion 310_14, a panel support part 320, and the mold rib 330, and the first auxiliary groove GR_14 may be disposed on the mold side surface portion 310_14 at the inner side of the mold rib 330 and formed to face downward. The first auxiliary groove GR_14 may be disposed on the mold side surface portion 310_14, and the first auxiliary groove GR_14 may partially or entirely overlap the mold side surface portion 310_14 in the third direction DR3. Further, an inner sidewall located at the outer side in the first direction DR1 among inner sidewalls of the first auxiliary groove GR_14 may be connected to an inner side surface of the mold rib 330 without a step height. The first auxiliary groove GR_14 may continuously extend in the second direction DR2, and extend from one side end to the other side end in the second direction DR2 in the panel support part 320 at the first short side SS1 and the second short side SS2. Accordingly, an extending length of the first auxiliary groove GR_14 in the second direction DR2 may be greater than an extending length of the mold rib 330 in the second direction DR2.

As shown in FIG. 15, when the first auxiliary groove GR_14 is disposed in the inner mold side surface portion 310_14 of the mold rib 330, unlike FIGS. 10, 11, and 12, the inner side surface of the mold rib 330 may further extend downward. Accordingly, an extending length of the mold rib 330 itself in the third direction DR3 may have no change, but an effect in which an extending length of the mold rib 330 in the third direction DR3 substantially increases may be present. The extending length of the mold rib 330 in the third direction DR3 may substantially increase without a change of the thickness of the mold rib 330 in the first direction DR1. In this case, the mold rib 330 may be further deformed by an external force. Accordingly, the mold rib 330 may be bent inward more than the mold rib 330 according to an exemplary embodiment by a tensile force which occurs due to the contraction of the polarizing film 110 and is applied to the protective film 120. When the mold rib 330 according to another exemplary embodiment is further bent, the tensile force applied to the protective film 120 may be further reduced, and the probability of an occurrence of a crack or the like in protective film 120 may be further reduced.

Referring to FIGS. 16 and 17, FIGS. 16 and 17 illustrate that a mold frame 300_16 may include a second auxiliary groove GR_16, and the second auxiliary groove GR_16 may be disposed under a mold rib 330, and on a mold side surface portion 310_16. That is, the mold frame 300_16 may include the mold side surface portion 310_16, a panel support part 320, and the mold rib 330, and the second auxiliary groove GR_16 may be disposed under mold rib 330 and formed to face inward from an outer side surface of the mold side surface portion 310_16. The second auxiliary groove GR_16 may partially or entirely overlap the mold rib 330 in the third direction DR3. The second auxiliary groove GR_16 may continuously extend in the second direction DR2, and extend from one side end to the other side end in the second direction DR2 in the panel support part 320 at the first short side SS1 and the second short side SS2. Accordingly, an extending length of the second auxiliary groove GR_16 in the second direction DR2 may be greater than an extending length of the mold rib 330 in the second direction DR2.

As shown in FIG. 17, when the second auxiliary groove GR_16 is disposed in an outer side surface of the mold side surface portion 310_16 at a lower portion of the mold rib 330, unlike FIGS. 10, 11, and 12, an outer side surface of the mold rib 330 may extend to be connected to the second auxiliary groove GR_16. In this case, an extending length of the mold rib 330 itself in the third direction DR3 may have no change, but since the an area between the mold rib 330, a portion of the panel support part 320 adjacent to the mold rib 330, and the second auxiliary groove GR_16 is connected to the mold rib 330, an effect in which an extending length of the mold rib 330 in the third direction DR3 substantially increases may be present. In this case, the mold rib 330 may be further deformed by an external force. Accordingly, the mold rib 330 may be bent inward more than the mold rib 330 according to an exemplary embodiment by a tensile force which occurs due to the contraction of the polarizing film 110 and is applied to the protective film 120. When the mold rib 330 according to still another exemplary embodiment is further bent, the tensile force applied to the protective film 120 may be further reduced, and the probability of an occurrence of a crack or the like in protective film 120 may be further reduced.

Figure 19:
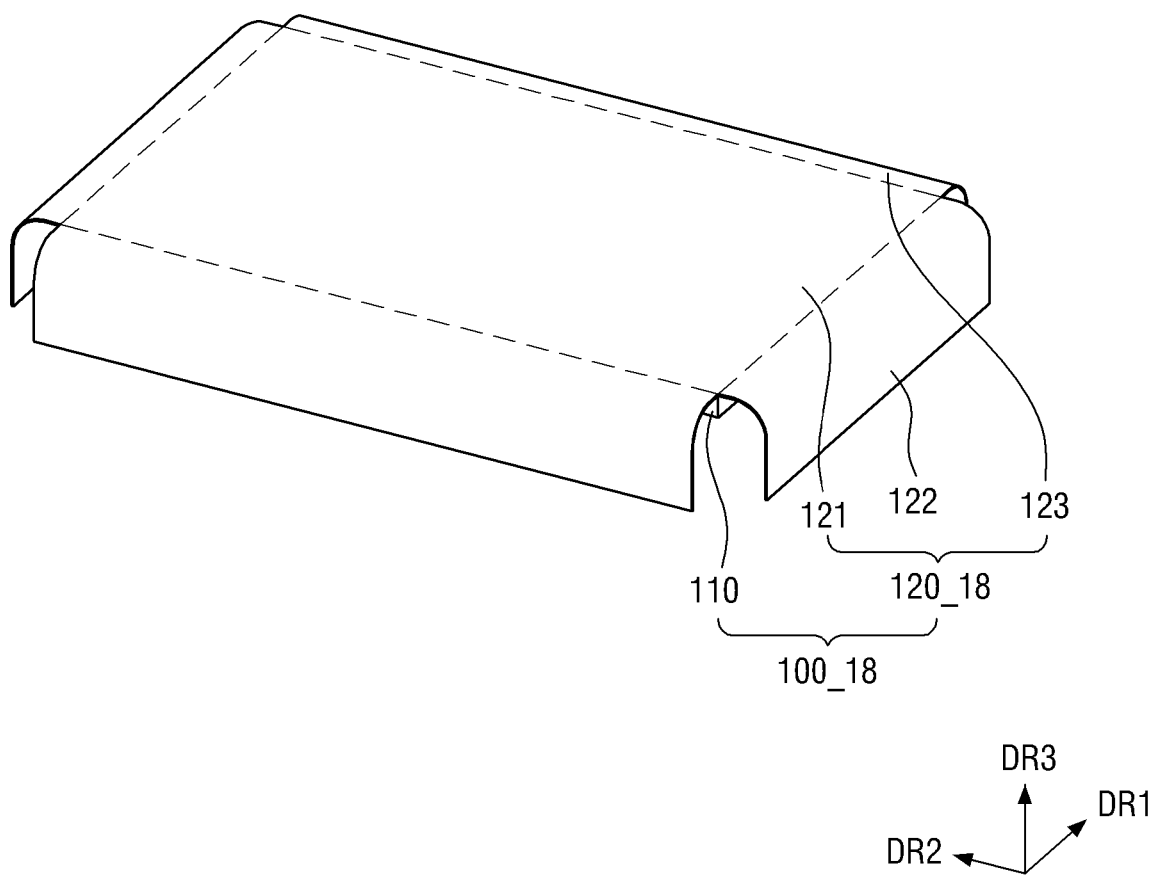
FIG. 19 is a perspective view of a polarizing member according to another exemplary embodiment.
Figure 20:
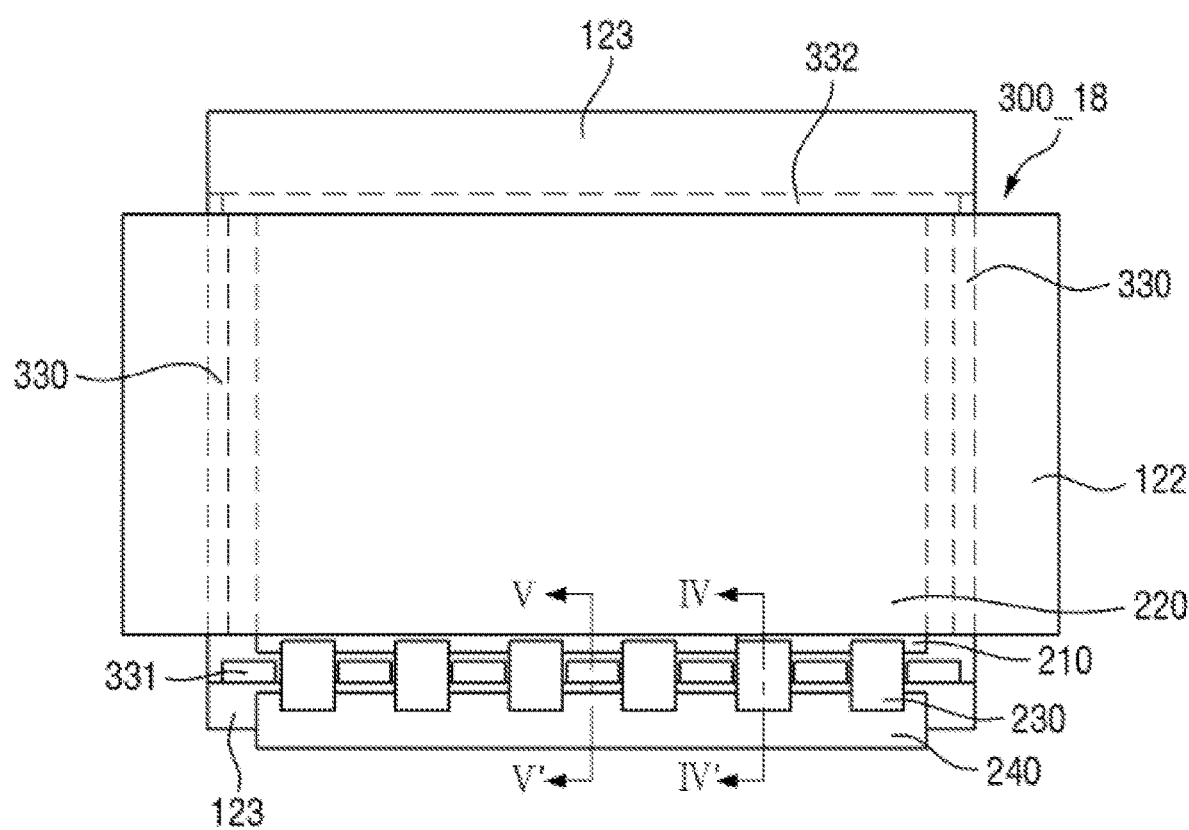
FIG. 20 is a plan view of the mold frame, the display panel, and the polarizing member coupled according to another exemplary embodiment, viewed from an upper portion of the polarizing member.
Figure 21:
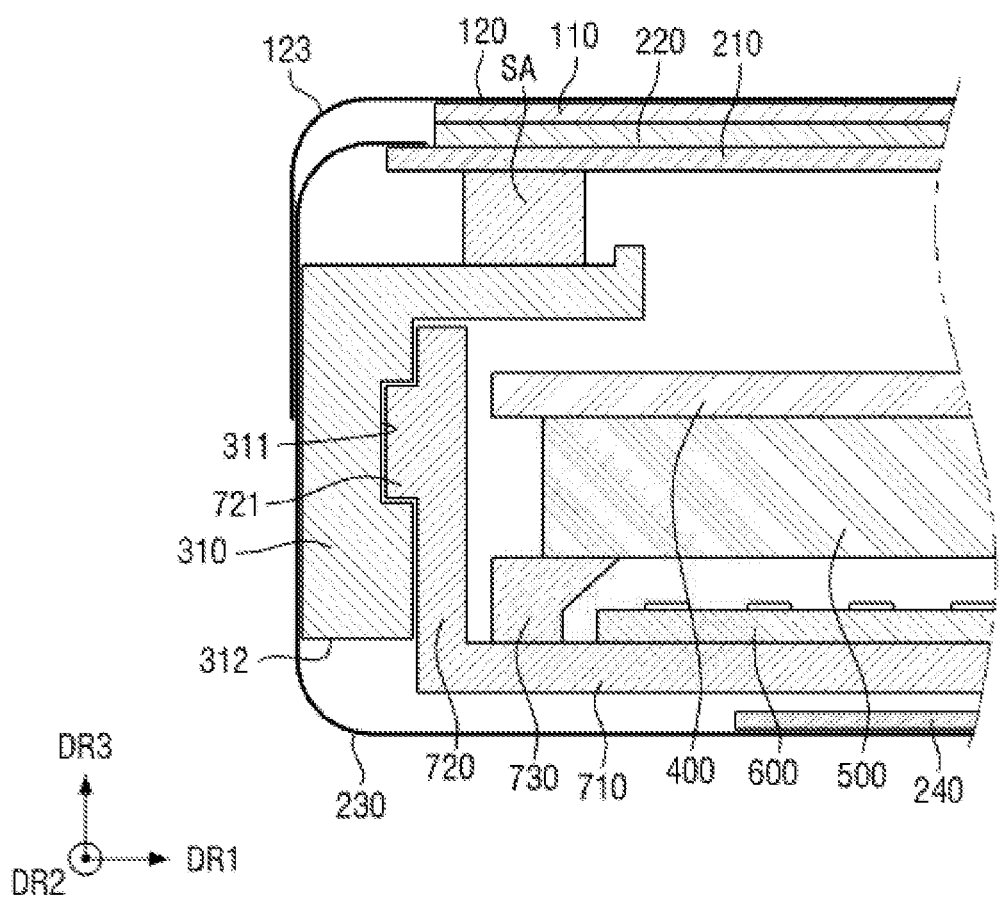
FIG. 21 is a cross-sectional view taken along a sectional line IV-IV' in FIG. 20.
Figure 22:
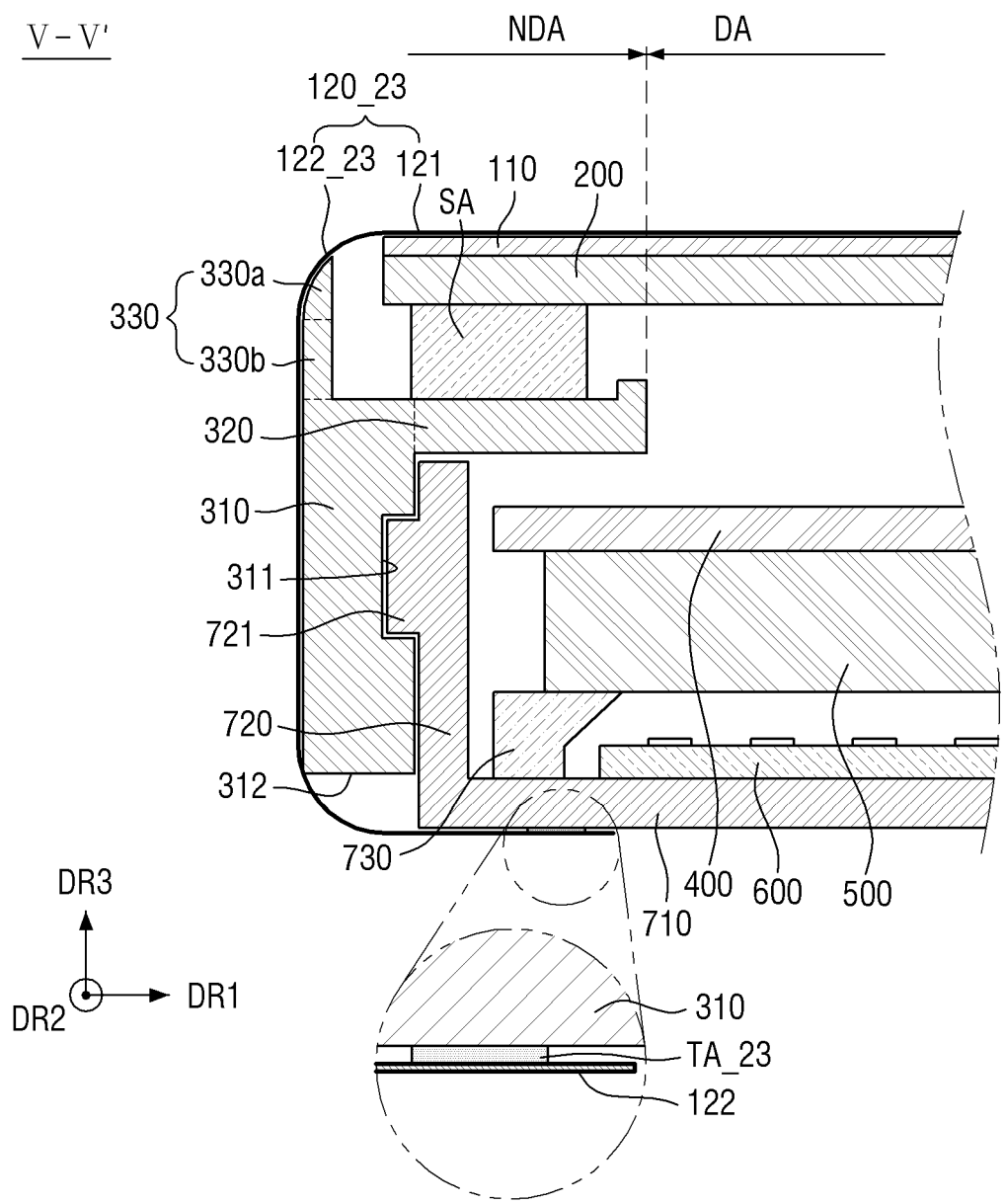
FIG. 22 is a cross-sectional view taken along a sectional line V-V' in FIG. 20.

FIG. 18 is a perspective view of a mold frame according to yet another exemplary embodiment. FIG. 19 is a perspective view of a polarizing member according to yet another exemplary embodiment. FIG. 20 is a plan view of the mold frame, the display panel, and the polarizing member coupled according to another exemplary embodiment, as viewed from an upper portion of the polarizing member. FIG. 21 is a cross-sectional view taken along a sectional line IV-IV' in FIG. 20. FIG. 22 is a cross-sectional view taken along a sectional line V-V' in FIG. 20.

FIGS. 18, 19, 20, 21, and 22 illustrate that a shape of each of a mold frame 300_18 and a polarizing member 100_18 may vary.

FIGS. 18, 19, 20, 21, and 22 illustrate that the mold frame 300_18 may include a first additional mold rib 331 and a second additional mold rib 332 not only at the first short side SS1 and the second short side SS2 but also at the first long side LS1 and the second long side LS2, and a protective film 120_18 of the polarizing member 100_18 may extend from a first protective area 121 in not only the first direction DR1 but also the second direction DR2. That is, the mold frame 300_18 may include mold ribs 330 at the first short side SS1 and the second short side SS2, and may further include the first additional mold rib 331 at the first long side LS1 and the second additional mold rib 332 at the second long side LS2. The protective film 120_18 of the polarizing member 100_18 may include the first protective area 121 and a second protective area 122 configured to extend from the first protective area 121 in the first direction DR1, and may further include a third protective area 123 extending from the second protective area 122 in the second direction DR2.

As shown in FIG. 18, the second additional mold rib 332 may extend in the first direction DR1, but the first additional mold rib 331 may not continuously extend in the first direction DR1, and may include a plurality of disconnected portions in an extending direction of the first additional mold rib 331.

As shown in FIG. 19, the polarizing member 100_18 according to yet another exemplary embodiment may be bent while surrounding not only side surfaces of one side and the other side of each of a polarizing film 110, a display panel 200, and a backlight unit BLU in the first direction DR1, but also side surfaces of one side and the other side of each of the polarizing film 110, the display panel 200, and the backlight unit BLU in the second direction DR2 unlike the polarizing member 100 according to an exemplary embodiment in FIGS. 1, 2, 3, 4, 5, 6, 7, 8, and 9.

Referring to FIG. 20, even when the first additional mold rib 331 includes disconnected portions in the extending direction, an extending length of each of the first additional mold rib 331 and the second additional mold rib 332 in the first direction DR1 may be the same as an extending length of the third protective area 123 in the first direction DR1 and an extending length of the display panel 200 in the first direction DR1. Accordingly, the third protective area 123, the first additional mold rib 331, and the second additional mold rib 332 may completely overlap in the third direction DR3.

A connection film 230 may be inserted into the intervals between the disconnected portions of the first additional mold rib 331 at the first long side LS1, and the first additional mold rib 331 may cover the connection film 230.

In FIG. 21, the cross-sectional view may have a shape substantially similar to the cross-sectional view of the first long side LS1 in FIG. 13. However, the third protective area 123 may be further disposed on the connection film 230 coupled to the first substrate 210 and the circuit board 240 and bent while surrounding the side surface of the backlight unit BLU at the first long side LS1. The third protective area 123 may come into close contact with the connection film 230, and may be bent on the connection film 230 while surrounding the side surface of each of the polarizing film 110_18, the display panel 200, and the backlight unit BLU at the first long side LS1. The third protective area 123 disposed on the connection film 230 may protect the connection film 230. Accordingly, since other components configured to protect the connection film 230 are not necessary, the thickness of the bezel at the first long side LS1 may be reduced.

In FIG. 22, the cross-sectional view may have a shape substantially similar to the cross-sectional view of the first short side SS1 and the second short side SS2 in FIG. 10. However, unlike FIG. 10, not the second protective area 122 but the third protective area 123 may extend from the first protective area 121 to be bent while surrounding the side surface of each of the polarizing film 110, the display panel 200, and the backlight unit BLU. Further, the third protective area 123 may be coupled to the mold side surface portion 310 at an outer side surface of the mold side surface portion 310 at the first long side LS1 by the bonding member TA.

Since the cross-sectional view at the second long side LS2 according to yet another exemplary embodiment is substantially the same as FIG. 22, overlapping descriptions will be omitted.

Figure 23:
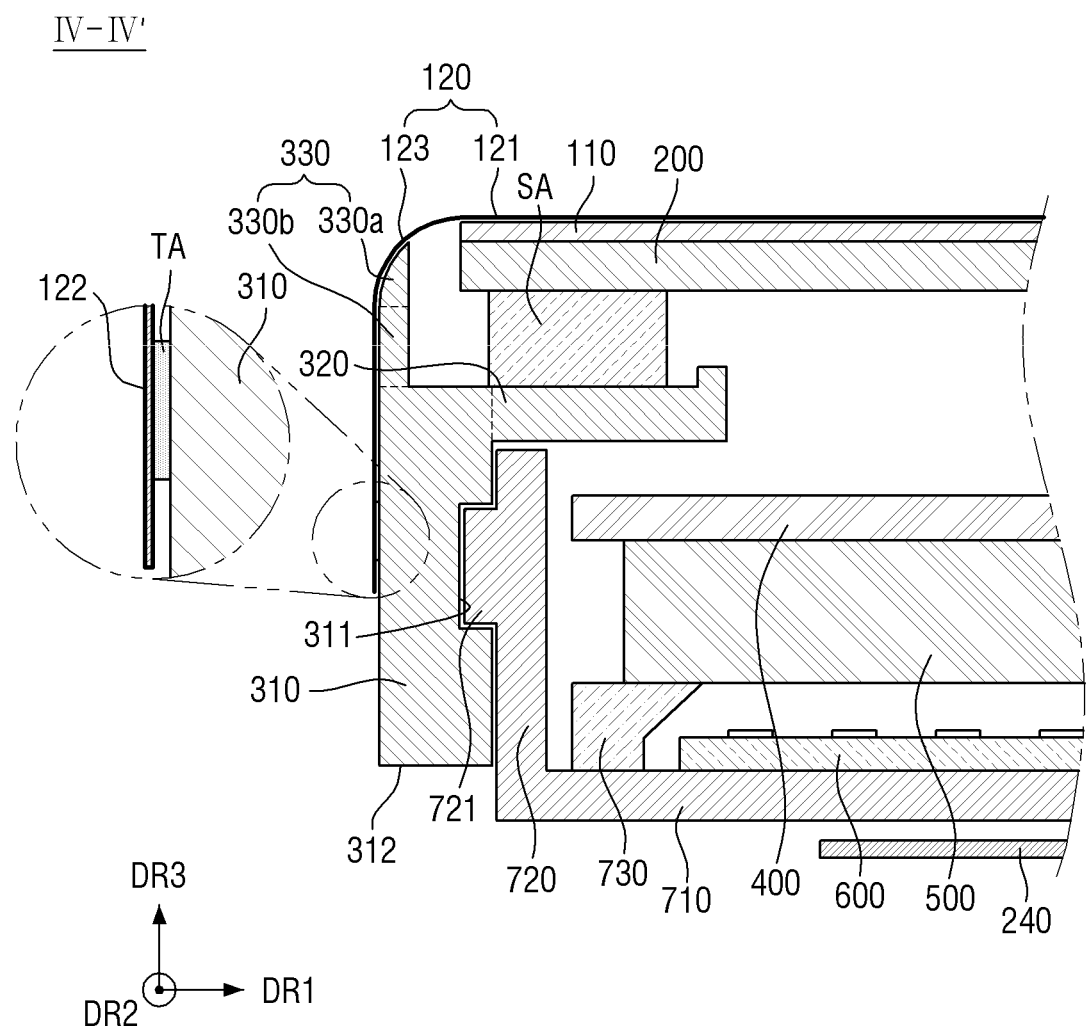
FIG. 23 is a cross-sectional view taken along a sectional line IV-IV' in FIG. 20 according to another exemplary embodiment.

FIG. 23 is a cross-sectional view taken along a sectional line IV-IV' in FIG. 20 according to another exemplary embodiment.

FIG. 23 illustrates that a length and a coupling position of the second protective area 122_23 may vary.

Referring to FIG. 23, FIG. 23 illustrates that the second protective area 122_23 may extend to a lower portion of a lower accommodation container 700, and may be coupled to the lower accommodation container 700 at a lower surface of a bottom surface 710 of the lower accommodation container 700. That is, the second protective area 122_23 may extend from the first protective area 121 and may be bent while surrounding the side surfaces of one side and the other side of each of the polarizing film 110, the display panel 200, and the backlight unit BLU in the first direction DR1, and an end of the second protective area 122 may be located under the lower accommodation container 700.

Unlike the second protective area 122 and the bonding member TA in an exemplary embodiment, an extending length of the second protective area 122_23 may be longer, and the second protective area 122_23 may further cover not only the side surfaces of each of the polarizing film 110, the display panel 200, and the backlight unit BLU but also a lower surface of the mold side surface portion 310 and a portion of a lower surface of the lower accommodation container 700. A lower surface bonding member TA_23 may be disposed on not the outer side surface of the mold side surface portion 310 but the lower surface of the bottom surface 710 of the lower accommodation container 700. Even in this case, since the second protective area 122_23 surrounds the side surfaces of one side and the other side of each of the polarizing film 110, the display panel 200, and the backlight unit BLU in the first direction DR1, and the end of the second protective area 122_23 is fixed to the mold frame 300, a structure in which bezels are not substantially present at the first short side SS1 and the second short side SS2 may be maintained.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
 a light source member;
 a mold frame having a rectangular shape disposed on the light source member;
 a display panel disposed on the mold frame; and
 a polarizing member disposed on the display panel, the polarizing member comprising:
  a polarizing film; and
  a protective film disposed on the polarizing film, the protective film comprising:
   a first protective area overlapping the polarizing film; and
   a second protective area protruding from respective sides of the first protective area and not overlapping the polarizing film,
 wherein the mold frame comprises:
  mold side surface portions;
  a panel support part extending inward from respective upper ends of the mold side surface portions; and
  mold ribs extending upward from the upper ends of the respective mold side surface portions, the mold ribs having widths smaller than those of the respective mold side surface portions,
 wherein the display panel is disposed on the panel support part of the mold frame, and
 wherein the second protective area of the protective film is bent to cover an outer side surface of the mold rib and an outer side surface of the mold side surface portion.

2. The display device of claim 1, wherein the second protective area of the protective film is attached to the outer side surface of the mold side surface portion.

3. The display device of claim 1, further comprising a bottom chassis disposed under the light source member,
 wherein the light source member is disposed in the bottom chassis.

4. The display device of claim 3, wherein the second protective area of the protective film further covers a lower surface of the mold side surface portion.

5. The display device of claim 4, wherein the second protective area of the protective film is attached to a lower surface of the bottom chassis.

6. The display device of claim 3, wherein the bottom chassis comprises:
 sidewall portions; and
 sidewall protruding portions protruding outward from the sidewall portions, and wherein the mold frame further comprises side surface grooves disposed in an inner side surface of the mold side surface portion, and
wherein the sidewall protruding portions are inserted into the side surface grooves.

7. The display device of claim 1, wherein a width of the mold rib is smaller than a width perpendicular to an extending direction of the panel support part.

8. The display device of claim 1, wherein the mold rib comprises:
a base portion adjacent to the mold side surface portion, the base portion having a uniform width; and
a tip portion connected to the base portion, the tip portion having a width smaller than a width of the base portion.

9. The display device of claim 8, wherein the width of the tip portion decreases in an upward direction.

10. The display device of claim 9, wherein an outer side surface of the base portion is aligned flush with an outer side surface of the mold side surface portion, and
wherein an inner side surface of the tip portion is aligned flush with an inner side surface of the base portion.

11. A display device comprising a first side, a second side, a third side, and a fourth side forming a quadrilateral shape, the display device comprising:
a light source member;
a mold frame having a rectangular shape disposed on the light source member;
a display panel disposed on the mold frame; and
a polarizing member disposed on the display panel, the polarizing member comprising:
a polarizing film; and
a protective film disposed on the polarizing film, the protective film comprising:
a first protective area overlapping the polarizing film; and
a second protective area protruding from the first side and the third side of the first protective area and not overlapping the polarizing film,
wherein the mold frame comprises:
mold side surface portions disposed along sides of the rectangular shape of the mold frame;
a panel support part extending inward from respective upper ends of the mold side surface portions; and
mold ribs extending upward from the upper ends of the mold side surface portions of the first side and the third side facing each other, the mold ribs having widths smaller than those of the respective mode side surface portions,
wherein the display panel is disposed on the panel support part of the mold frame, and
wherein the second protective area of the protective film is bent to cover an outer side surface of the mold rib and an outer side surface of the mold side surface portion.

12. The display device of claim 11, wherein the first side and the third side are short sides, and
wherein the second side and the fourth side are long sides.

13. The display device of claim 11, wherein the mold rib comprises:
a base portion adjacent to the mold side surface portion, the base portion having a uniform width; and
a tip portion connected to the base portion, the tip portion having a width smaller than a width of the base portion,
wherein a width of the tip portion decreases in an upward direction.

14. The display device of claim 13, wherein an outer side surface of a base portion is aligned flush with an outer side surface of the mold side surface portion, and
wherein an inner side surface of the tip portion is aligned flush with an inner side surface of the base portion.

15. A mold frame having a rectangular shape frame with a first side, a second side, a third side, and a fourth side, the mold frame comprising:
side surface portions disposed along sides of the rectangular shape frame;
inner extending portions extending inward from upper ends of the side surface portions of the sides; and
ribs extending upward from the upper ends of the respective side surface portions of the first side and the third side facing each other,
wherein the first side and the third side longitudinally extend in a first direction when viewed in plan,
wherein opposing ends of each of the side surface portions of the first side and the third side are spaced apart by a first distance in the first direction, and
wherein opposing ends of at least one of the ribs are spaced apart by a second distance less than the first distance in the first direction.

16. The mold frame of claim 15, wherein opposing ends of each of the ribs are spaced apart by the second distance in the first direction, and
wherein opposing ends of the inner extending portion are spaced apart by a third distance greater than the second distance in the first direction.

17. The mold frame of claim 15, wherein the first side and the third side are short sides, and
wherein the second side and the fourth side are long sides.

18. The mold frame of claim 15, wherein each rib comprises:
a base portion adjacent to the side surface portion, the base portion having a uniform width; and
a tip portion connected to the base portion, the tip portion having a width smaller than a width of the base portion.

19. The mold frame of claim 18, wherein a width of the tip portion decreases in an upward direction.

20. The mold frame of claim 19, wherein an outer side surface of the base portion is aligned flush with an outer side surface of the side surface portion, and
wherein an inner side surface of the tip portion is aligned flush with an inner side surface of the base portion.

* * * * *